United States Patent
Hoarty

(10) Patent No.: US 9,607,650 B2
(45) Date of Patent: Mar. 28, 2017

(54) SYSTEMS AND METHODS FOR REDUCING AUDIO DISTORTION DURING PLAYBACK OF PHONOGRAPH RECORDS USING MULTIPLE TONEARM GEOMETRIES

(71) Applicant: W. Leo Hoarty, Morgan Hill, CA (US)

(72) Inventor: W. Leo Hoarty, Morgan Hill, CA (US)

(*) Notice: Subject to any disclaimer, the term of this patent is extended or adjusted under 35 U.S.C. 154(b) by 0 days.

(21) Appl. No.: 14/929,682

(22) Filed: Nov. 2, 2015

(65) Prior Publication Data

US 2016/0125911 A1 May 5, 2016

Related U.S. Application Data

(60) Provisional application No. 62/074,076, filed on Nov. 2, 2014.

(51) Int. Cl.
| | |
|---|---|
| *H04B 1/20* | (2006.01) |
| *G11B 11/20* | (2006.01) |
| *G11B 20/02* | (2006.01) |
| *G11B 27/028* | (2006.01) |
| *G11B 27/034* | (2006.01) |
| *G11B 19/00* | (2006.01) |
| *G11B 27/026* | (2006.01) |
| *H04H 60/04* | (2008.01) |

(52) U.S. Cl.
CPC .............. *G11B 11/20* (2013.01); *G11B 20/02* (2013.01); *G11B 19/00* (2013.01); *G11B 27/026* (2013.01); *G11B 27/028* (2013.01); *G11B 27/034* (2013.01); *H04H 60/04* (2013.01)

(58) Field of Classification Search
None
See application file for complete search history.

(56) References Cited

U.S. PATENT DOCUMENTS

| | | |
|---|---|---|
| 2,601,987 A | 7/1952 | Vivie |
| 3,940,149 A | 2/1976 | Nagamura |
| 4,295,277 A | 10/1981 | Dennesen |
| 4,628,500 A | 12/1986 | Thigpen |

(Continued)

OTHER PUBLICATIONS

International Search Report (PCT/US2015/058572).
Written Opinion of the International Searching Authority (PCT/US2015/058572).

*Primary Examiner* — Tan X Dinh
(74) *Attorney, Agent, or Firm* — Puget Patent; Michael Gibbons

(57) ABSTRACT

Systems and methods are disclosed relating to electromechanical devices and related computer control and audio processing systems intended to optimize playback fidelity of phonograph records. Said recordings are manufactured by a process that employs a cutting head assembly driven in a straight path from the outer to the inner-most radius of the recordable surface. However, most record turntables device that are used to play back phonograph records rely on a stylus transducer attached to the end of a pivoting arm. Instead of the linear path followed by the original cutting head, said tonearm traces an arc across the surface of the recorded disk resulting in playback distortion proportional to error in alignment of said stylus relative to the tangent of the groove. This invention addresses this deficiency and produces an optimal audio quality of playback of phonograph records.

20 Claims, 37 Drawing Sheets

(56) References Cited

U.S. PATENT DOCUMENTS

| | | | |
|---|---|---|---|
| 5,734,731 A * | 3/1998 | Marx | H04H 60/04 381/119 |
| 6,262,777 B1 * | 7/2001 | Brewer | G11B 27/034 348/423.1 |
| 8,576,687 B1 | 11/2013 | Schroder | |
| 2004/0057344 A1 | 3/2004 | Baumann | |
| 2005/0002319 A1 * | 1/2005 | Fadeyev | G11B 3/70 369/272.1 |
| 2005/0102049 A1 | 5/2005 | Smithers | |
| 2012/0259642 A1 | 10/2012 | Takada | |
| 2014/0160590 A1 | 6/2014 | Sankaranarayanan et al. | |

\* cited by examiner $L$ = Effective Length
$r_1$ = Innermost Groove Radius
$r_2$ = Outermost Groove Radius Optimum Angular Offset: $\alpha = \arcsin\sqrt{\dfrac{\left(\dfrac{r_1+r_2}{2}\right)^2}{r_1 r_2}+1}$ ---601

Linear Offset: $p = L \sin \alpha$ ---602

Optimum Angular Offset: $L$ = Effective Length ---603

Overhang: $d = L - \sqrt{L^2 - N_1 N_2}$ ---604

Inner Null Radius: $N_1 = \dfrac{2 r_1 r_2}{\left(1+\dfrac{1}{\sqrt{2}}\right) r_2 + \left(1-\dfrac{1}{\sqrt{2}}\right) r_1}$ ---605

Outer Null Radius: $N_2 = \dfrac{2 r_1 r_2}{\left(1-\dfrac{1}{\sqrt{2}}\right) r_2 + \left(1+\dfrac{1}{\sqrt{2}}\right) r_1}$ ---606

FIG. 6 audio segment alignment process

Outer Arm: 120mm to 150mm – offset 31.9mm, overhang 38.0mm

US 9,607,650 B2

SYSTEMS AND METHODS FOR REDUCING AUDIO DISTORTION DURING PLAYBACK OF PHONOGRAPH RECORDS USING MULTIPLE TONEARM GEOMETRIES

PRIORITY CLAIM

This application claims the benefit of U.S. Provisional Patent Application No. 62/074,076, entitled "SYSTEMS AND METHODS FOR REDUCING AUDIO DISTORTION DURING PLAYBACK OF PHONOGRAPH RECORDS USING MULTIPLE TONEARM GEOMETRIES," filed Nov. 2, 2014, naming W. Leo Hoarty as the inventor. The foregoing application(s) are either currently or are applications of which the instant or a currently application is entitled to the benefit of the filing date.

FIELD OF THE INVENTION

This invention relates generally to the conversion of analog music stored on phonograph records to high-resolution digital files. More specifically, the invention involves a method of employing a plurality of tonearms and phonograph cartridges in association with a single phonograph playback device; with each such tonearm and cartridge pair optimally aligned for some specific subset of the recorded area of the phonograph record in a manner that minimizes the tracking error-induced audio distortion within said area. The system of the invention further utilizes an analog-to-digital converter to digitize the output of each phonograph cartridge. An optical sensor means is used to detect each tonearm's position during playback and to register to a memory means the time location of the respective record file of each phonograph cartridge with the intended crossover point where one cartridge recording ends and the next cartridge recording is to begin. A digital stitching means then combines the individual digital audio files into a single digital audio file for real time playback or storage of said file.

BACKGROUND

The music recording industry went through a transition to digital audio recording methods in the 1980s. Most major recording studios adopted early-generation digital recording equipment replacing the then thirty-year-old analog tape recording equipment. The product of the technology shift was the now ubiquitous compact disc recording or CD which rapidly replaced the long-playing analog disk now as the vinyl LP.

The initial generation of digital audio processing equipment is now recognized as deficient in audio accuracy in many ways and the quality of audio recordings suffered as a result. Hence, many audiophiles rejected the sound quality of CDs and remained users of the vinyl LP and its associated playback means. In the last decade, the sales of vinyl LPs has seen a strong growth with sales increasing more than 50% year-over-year.

The typically mature audiophile continues to be a major purchaser of both new and used LPs and, in the last decade or so, has been joined by a much younger generation who are discovering the refined audio quality of the vinyl LP recording. Undoubtedly, the fascination of the old-fashioned technology and associated equipment attracts many new users but the audio industry continues to innovate and produced better quality playback equipment at all price points of the consumer electronics industry.

The old-generation, master recording analog magnetic tapes are aging, missing or were destroyed in several notable fires in storage facilities. The analog magnetic tape masters still on the shelves of the record companies after many decades are aging and demagnetizing. Further loss of reference recordings occurred because many popular artist's analog tape recordings from the period of the late 1950's to the mid-1980's, when the digital recording transition began, were transferred to digital tape and the original analog recordings were actually discarded.

The last many decades have left the archive libraries of master tapes of great music with poor quality audio recordings of some very important musicians and performances. This gap spans the period of around 1985 to as recently as 2010. When a music label or service wishes to re-release a recording from the past, if the master tape is missing, the company will use a phonograph recording and record it digitally. This industry technique is known to the skilled person as a "needle drop."

In order to obtain a usable recording from a phonograph record one needs to apply many engineering best practices including the use of high-end turntables and high-quality audio electronics. Most phonograph players use single tonearms that trace an arc across the surface of the record as the needle follows the groove. Unfortunately, the record master disk was cut on a lathe with a cutting head driven on a worm screw straight across the surface of the disk. This mismatch of geometries of a straight line versus an arc results in measurable playback distortion.

Various attempts to minimize said tracking distortion of phonograph players have been proposed. The most obvious solution is to use a so-called linear tonearm where instead of pivoting in an arc at the end of a fixed shaft, the cartridge is transported along a direct radial path following the straight track of the original cutting head. However, the record master cutting head was pushed across the master record on a turning worm screw shaft while cutting the master whereas said linear playback solutions introduce new sources of distortion and noise due to side-loading forces on the stylus and cantilever resulting from the force exerted to pull the entire playback mechanism along the record from outer to inner groove.

This invention addresses the need for much more accurate playback of phonograph records which is of particular interest to recording studios that need to recover previous made recordings with quality close to the original master tapes that made the phonograph recording.

SUMMARY OF THE INVENTION

The solution to minimizing the pivoting tonearm tracking distortion on playback is to create a tonearm that enables the playback stylus to precisely replicate the linear path of the cutting head. Called a "linear tonearm," such solutions have been proposed for decades, but have proven to be exceedingly expensive to implement while at the same time introducing their own sources of distortion and noise in terms of side-loading forces on the stylus in the groove and noise from the shuttle mechanism utilized to carry the arm and cartridge, among other problems.

The object of this invention then is to utilize a plurality of traditional pivoting tonearms, typically using identical phonograph cartridges, but modified according to the method of the invention whereby each said tonearm is aligned and calibrated to play back audio from a predetermined subset of the total radial distance of the subject phonograph record and to do so with the least amount of distortion. In one example of the invention, with a two-arm playback system of the invention, one arm would record from the lead-in groove point at a distance of 146 mm from the spindle to, in this example, 90 mm from the spindle. The second arm would record from 100 mm from the spindle to the end point lead-out groove at approximately 60 mm from the spindle. The two or more tonearms of the invention can be positioned and recorded simultaneously or sequentially. If sequentially, each said arm will be digitally recorded through a common analog-to-digital (ADC) converter with an analog switching means directing the respective tonearm signal to the ADC. Said tonearms are mechanically positioned and removed from the recording surface by a computer-controlled positioning system of the invention. Another system of the invention finds the precise splice point in the multiplicity of overlapping digitally-recorded audio streams to stitch said recordings into a single, uninterrupted digital audio representation of the record album.

While turntables with multiple tonearms are well known to those skilled in the art, their purpose has generally been to mount phonograph cartridges optimized for, among other things, different types of recording standards such as stereo or monaural disks, or for play back of older 78 rpm recordings which pre-dated the long-playing era that began in the 1950's and which require special cartridges. In addition, some audiophiles, as serious hobbyists, have a turntable with a plurality of tonearms equipped with various cartridges simply to compare and enjoy the different tonal qualities of a variety of brands or styles of tonearms and/or cartridges.

A digital image-processing program is configured to detect each arm as it crosses into and out of its respective recording region. The time position of these respective event points is recorded and used by a digital audio splicing means of the invention to locate the approximate audio overlap points. Then, by means of autocorrelation, the system of the invention finds the exact splice point between respective pairs of audio recordings and joins the two files into one contiguous digital recording with no discernable audible artifact. Any number of tonearms can be applied to this method with subsequently smaller playback areas and even lower distortion being recorded per arm. Based on the testing done in the development of the present Invention, little perceptually detectable improvement is gained beyond employing four tonearms, and practically speaking, a system with two tonearms is often sufficient.

The optical means of detecting tonearm position on the surface of the recorded medium and automatically marking its position in the audio file recorded from said tonearm is a convenience. Using audio matching algorithms such as autocorrelation is sufficient to align the separate audio tracks for the purposes of splicing said tracks into a single audio file. The splice points between the now aligned audio tracks is determined without the advantage of the optical monitoring means by measuring total time of the recorded audio and dividing said time by the proportion of the disk that each arm is calibrated to record. The presence of position markers merely simplifies this task.

Since each tonearm and cartridge combination associated with the subject playback turntable has been independently mechanically adjusted and calibrated to minimize tracking error and the resulting distortion for a specific subset of the total outer to inner arc, the average tracking distortion for the assembled sections is diminished to a small fraction of what would normally be encountered with even the best single-arm approach. In fact, the resulting audio recovered from the recorded groove has total harmonic distortion characteristics quite close to a linear tracking tonearm but with none of the distortion caused by a linear playback arm nor any of the noise of the bearings of the shuttle assembly supporting the linear arm.

Other scholarly studies have been published, for example H. G. Baerwald's "*Analytic Treatment of Tracking Error and Notes on Optimal Pick-Up Design*" Published May 1, 1941, and B. B. Bauer "*Tracking Angle*" published in Electronics in March 1945, are examples and are also incorporated by reference herein, providing additional detail on this matter and offering slightly different approaches to optimizing the alignment of cartridges and tonearms.

What is disclosed in some embodiments is a system for reducing audio distortion in the playback of an analog phonograph record by employing a plurality of radially-mounted tonearms each traversing a subset of the total radial distance across the surface of an audio recording. The subset of the surface recorded by said tonearm approached the ideal tracking accuracy of a linear tonearm.

Disclosed in other embodiments is a system where the audio is digitized from each of a plurality of tonearms and stored as respective digital files which are then joined to form a single representation of the audio recording. Disclosed in other embodiments is a system where an optical detector is used to ascertain the position of each participating tonearm and upon detecting a predetermined position, to record the time position of said tonearm. Disclosed in other embodiments is a system where a plurality of tonearms simultaneously record respective subsets of a phonograph record surface thereby reducing the time to record said phonograph record to total time of phonograph information divided by the number of tonearms employed.

Disclosed in other embodiments is a system where by a single computer-controlled, motor-adjustable tonearm means may be employed to playback individual bands of an audio recording where the offset angle of the tonearm head assembly is automatically set and fix for a portion of said recording. The controller means adjusts the offset angle for each subset of the recording surface. Disclosed in other embodiments is a system where a video camera is position above a rotating turntable such that said camera can provide a continuous image to a control means which calculated the rotational speed of the turntable platter and provides information to a motor speed controller to maintain precise adjustment of said speed.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF DRAWINGS

FIG. 6 are the formulas developed by Lofgren and Baerwald in the first half of the 20$^{th}$ century to calculate the parameters described above to set the arm and cartridge position to minimize tracking distortion. Optimum Angular Offset 601 computers the angle $\alpha$ which is used to calculate the Linear offset 601 which determines Effective Length 603 which further determines Overhang 604 with the aid of Inner Null Radius 605 and Outer Null Radius 606.

Figure 12:
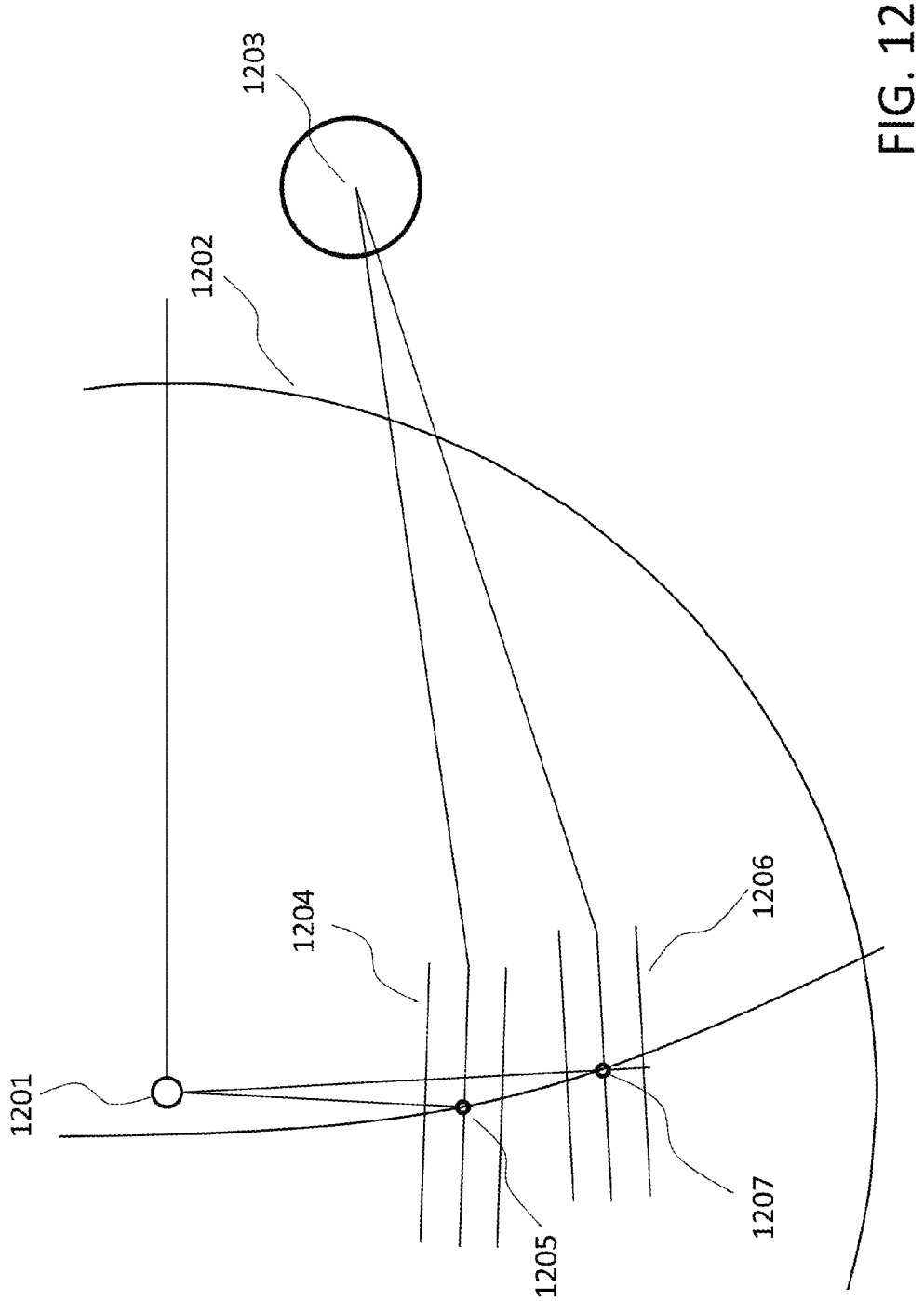

FIG. 12 is a template used to calibrate the inner tonearm of an exemplary two-arm embodiment. A hole is punched at 1201 for the turntable spindle. The template is cut-out along circumference 1202 and a placed over the spindle and aligned with tonearm pivot 1203. The stylus is placed in the 1206 grid and the cartridge shell is rotated to be parallel to the grid lines. The cartridge head is moved out or in such that the stylus touches point 1207. The tonearm is then swung to grid 1204 and the process checked for the stylus touching point 1205 and the cartridge shell remaining parallel to the grid lines. Upon achieving alignment, the cartridge is tightened to lock the calibration and the tonearm is ready to be used for the outer sector playback of a phonograph record with minimum tracking error and concomitant distortion.

Figure 13:
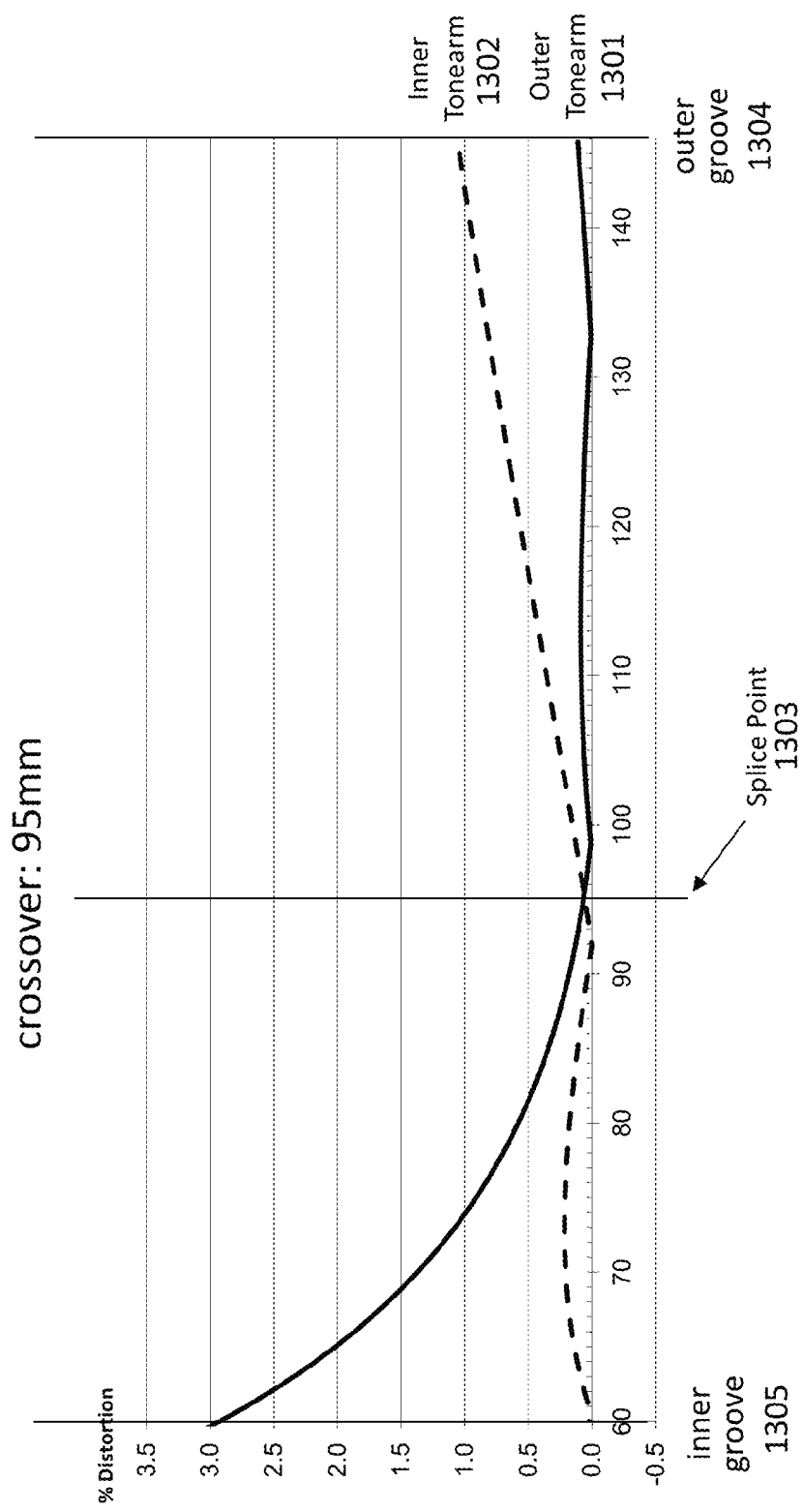

FIG. 13 illustrates a core advantage enabled by the invention which is the ability to seamlessly combine the audio signals picked by each of a plurality of independently calibrated tonearms. This example plots the graph of a two tonearm embodiment with each such tonearm specifically optimized for a specific subset of the area on the recording as explained above. By seamlessly splicing or stitching the digital recording of the outer tonearm to the inner tonearm at the appropriate crossover point 1303 (95 mm from the spindle in this example), the two sections are combined resulting in a nearly uniformly low tracking error and concomitant distortion.

Figure 14:

FIG. 14 is a graph of the complete recording of a side of a phonograph record resulting from combining two tonearms recorded output as shown in FIG. 13. As can be seen, the result is a tracking distortion across the entire recorded surface that is no higher than 0.2% at any point and considerably lower than a single tonearm.

Figure 15:
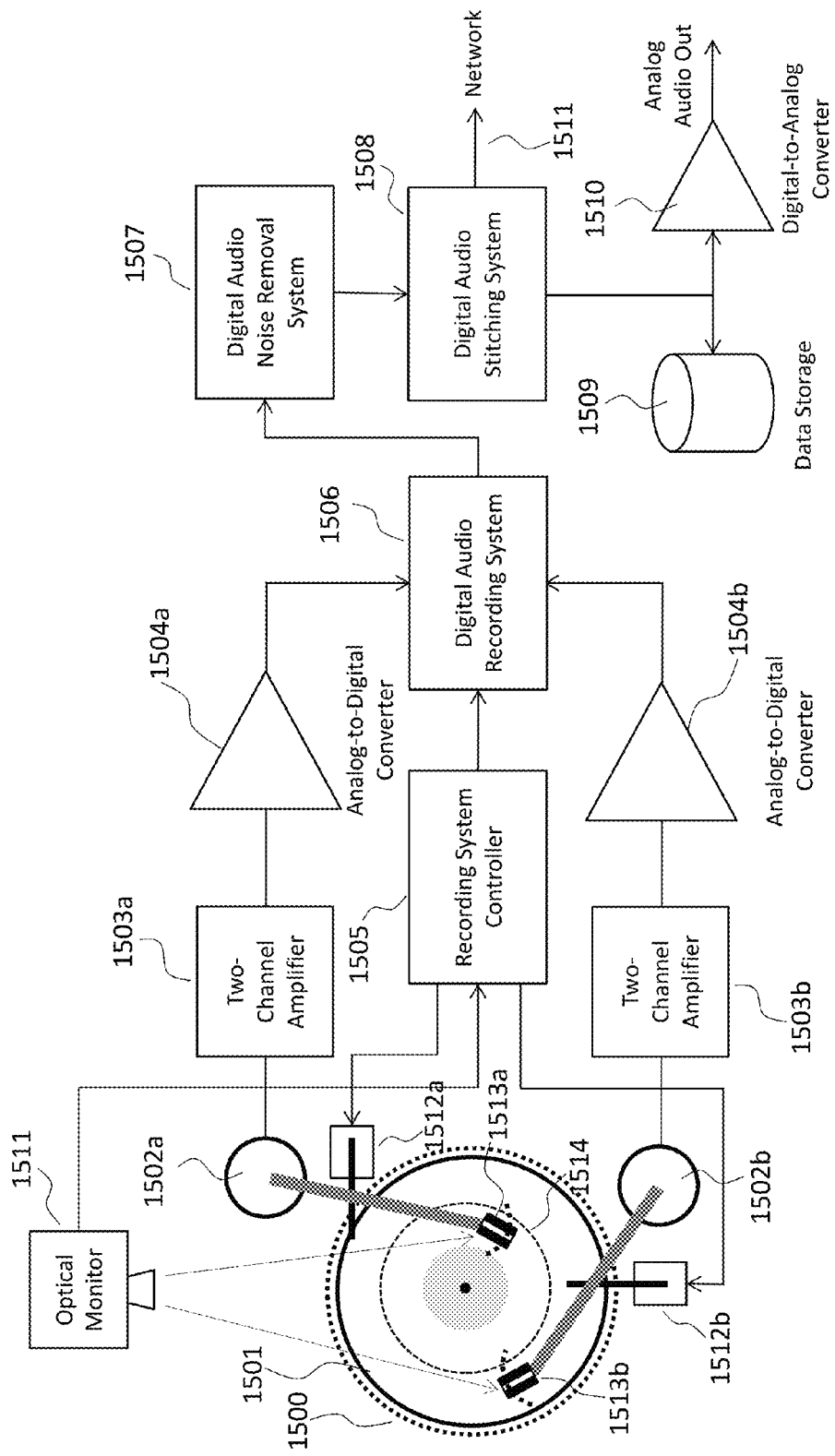

FIG. 15 is a schematic diagram and flow chart providing an overview of one exemplary version of the Invention using the two-tonearm embodiment. The record being played back 1501 is positioned on a turntable 1500 equipped with two pivoting tonearms in this example, and two matching cartridges, 1513*a* and 1513*b*. The tonearms are each associated with the stepping motor means of the Invention 1502*a* and 1502*b* to aid in positioning. Each tonearm is further associated with a lifting means 1512*a* and 1512*b* to further automate the positioning of the tonearm, more detail of which may be found in FIG. 20. The dotted line 1514 designates the approximate boundary between the recorded area covered by the outer tonearm 1513*b* and the inner tonearm 1513*a*. An optical monitoring means 1511 provides imagery to the recording system controller 1505 to facilitate precise monitoring and positioning functionality. The stereo output of each of the cartridge systems on the tonearms is amplified by 1503*a* and 1503*b* respectively, and converted to a digital signal in 1504*a* and 1504*b* respectively, the outputs of which are both sent to the digital audio recording system 1506. The output of 1506 is then sent to 1507, the digital audio noise removal means of the Invention, and then to 1508, the digital audio stitching means of the Invention which makes the "splice" 2104, shown in FIG. 21. Output of 1508 is then stored in 1509 and converted back to analog for playback 1510.

Figure 15B:
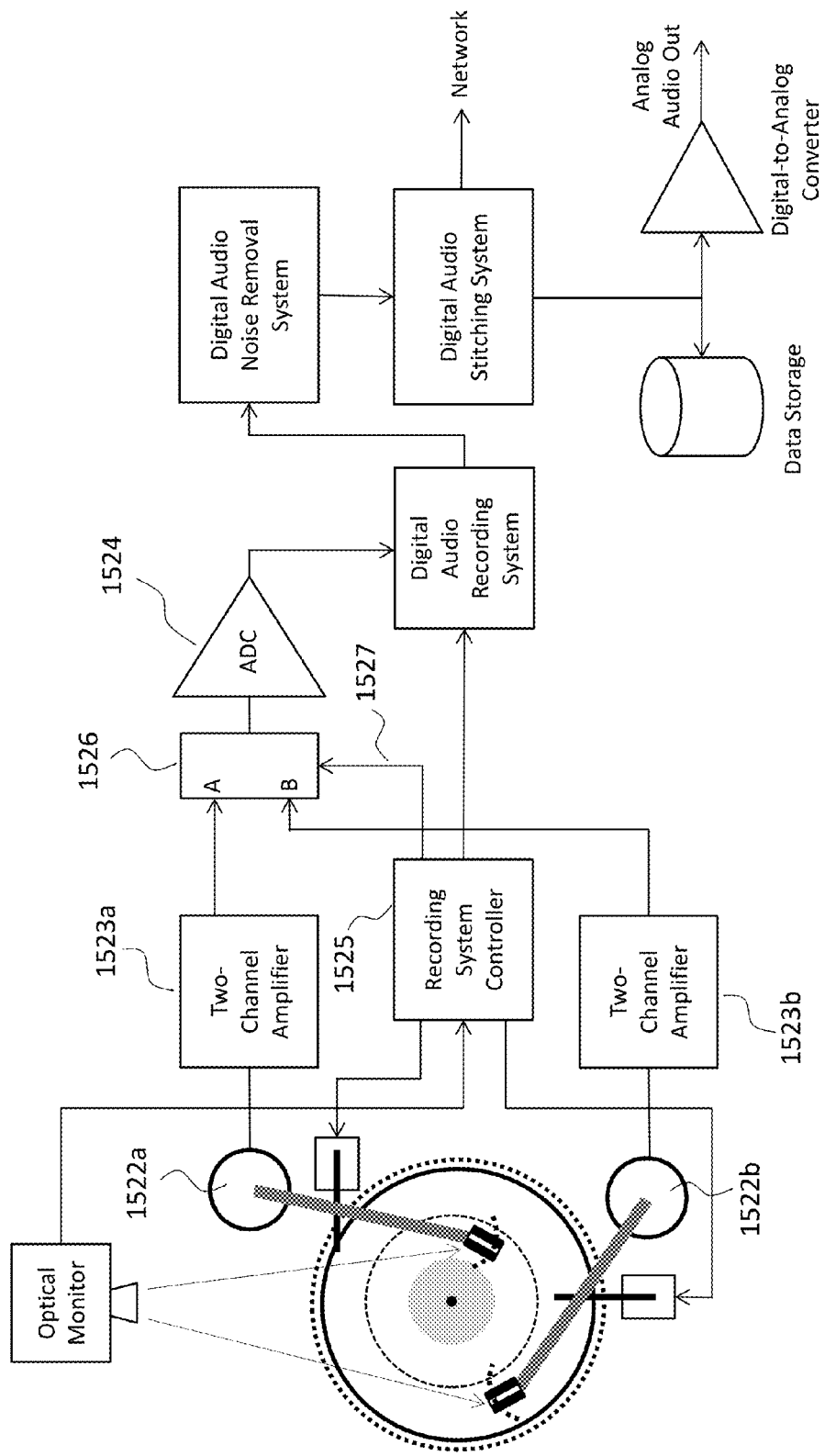

FIG. 15*b* is a schematic of an alternative embodiment where only one tonearm is digitized at a given time. An analog switch 1525 is utilized to select one of a multiplicity of tonearm audio signals from amplifier means 1523*a* or 1523*b*, in this embodiment. The Recording System Control (RSC) 1525 is programmed to cause the selection of the appropriate audio input by means of control line 1527 when the respective tonearm is placed on the recorded surface by said RSC. The output of the audio switch is applied to the input of the ADC 1524*a* to be converted to a digital signal for further processing.

Figure 16:
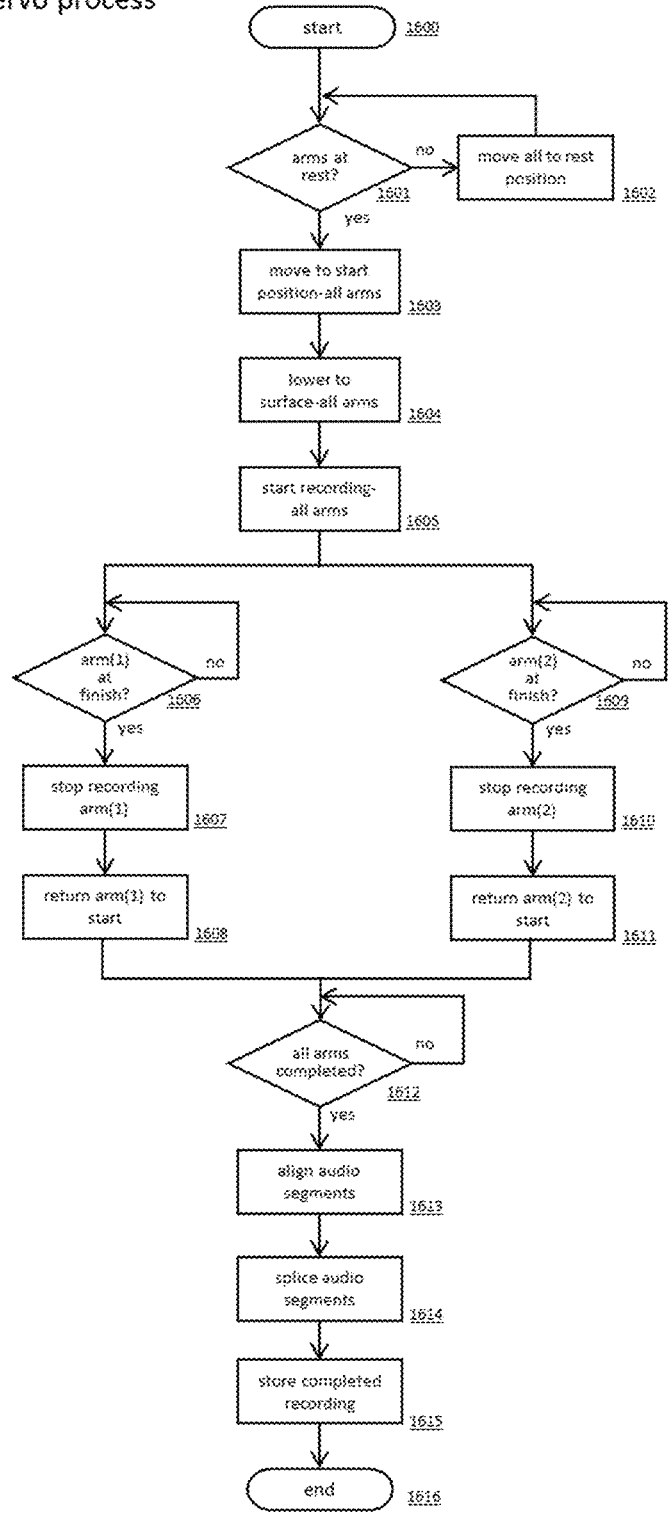

FIG. 16 is a flowchart which defines a control flow for the tonearm positioning servo system. Said system utilizes computer-numerically-controlled (CNC) system means to position the tonearms of the invention and to lift and return said tonearms to rest position at the end of each respective recording track.

Figure 17:
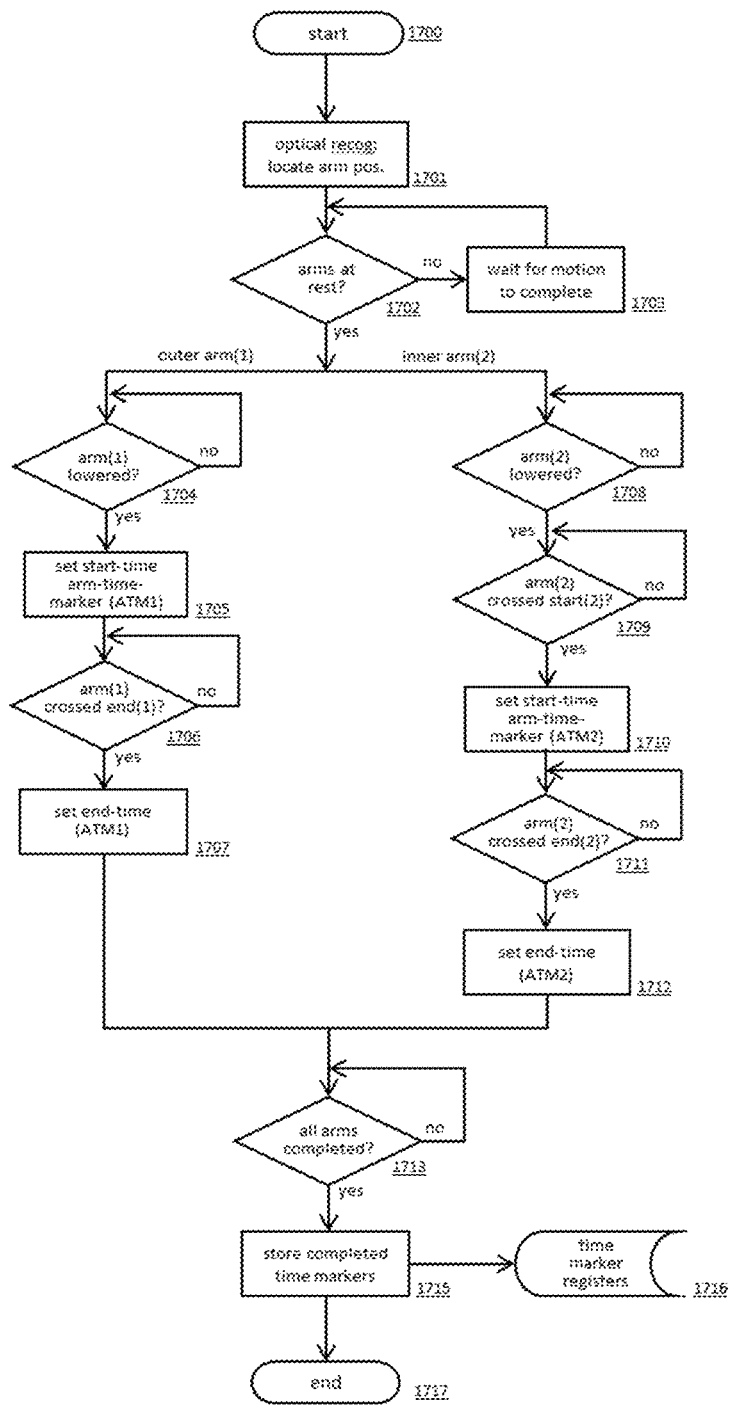

FIG. 17 is a flowchart which defines a control flow for the optical recognition process to detect and direct tonearm CNC system to move respective tonearms into position, lower said tonearms and then lift and return said tonearms to resting position.

Figure 2:
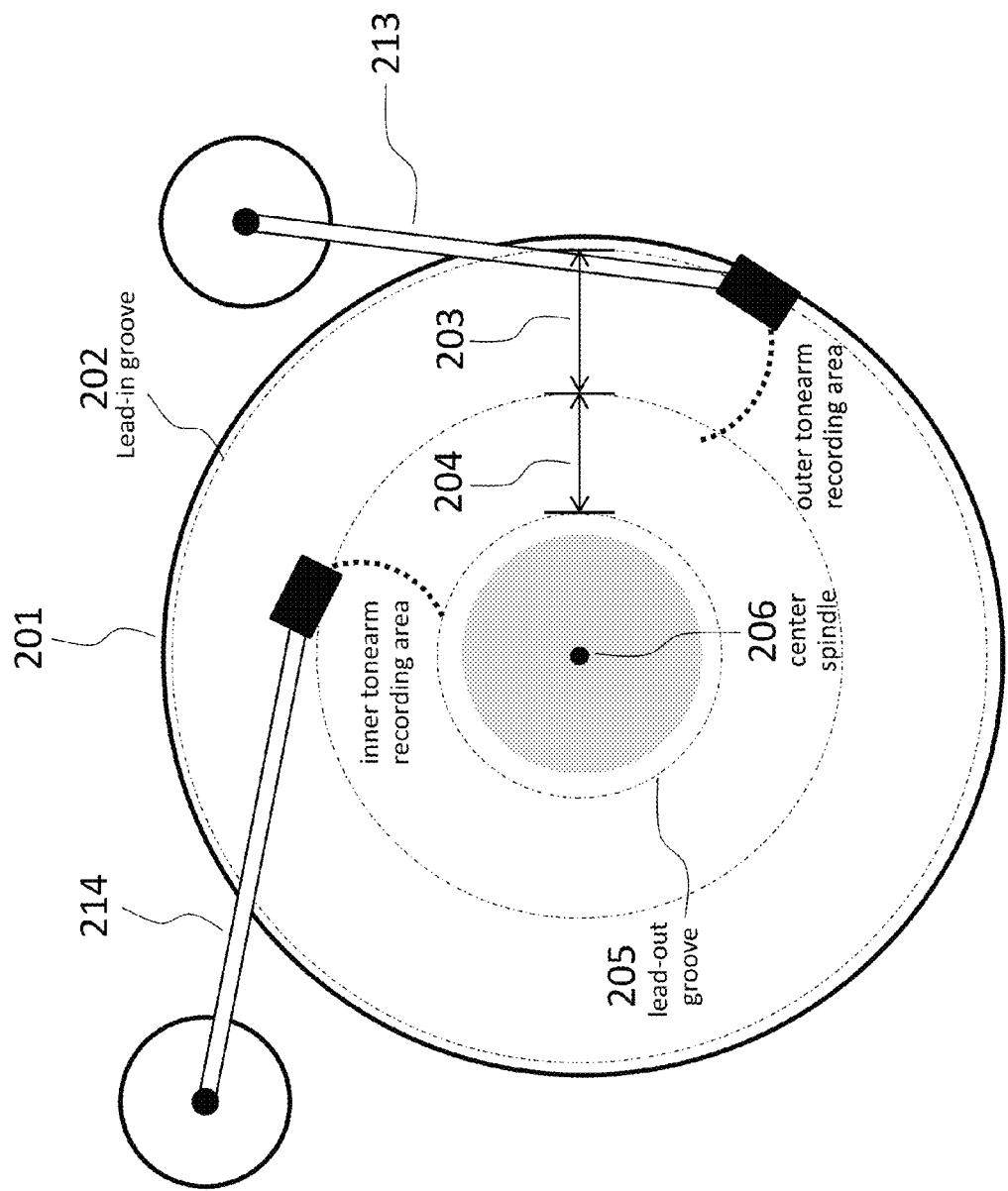
FIG. 2 illustrates the surface areas of a phonograph recording 201, as is addressed by an exemplary two-tonearm embodiment of the Invention. The traditional recorded area between the lead-in groove 202 and lead-out groove 205 is now treated as two areas of the outer area 203 and an inner area 204. Three or more tonearms could be employed with proportionately less surface area traversed by each said arm. In one embodiment, all arms are simultaneously placed at the start of their respective areas. In this figure, outer arm 213 is placed at the start of area 203 on the lead-in groove and inner arm 214 is placed just before the start of area 204 overlapping the end of area 203. Each arm is digitally recorded to a separate audio track which traversing each respective surface area. At the end of the recording area, each arm is mechanically lifted and returned to said arm's respective rest position by means of the invention later described.
Figure 18:
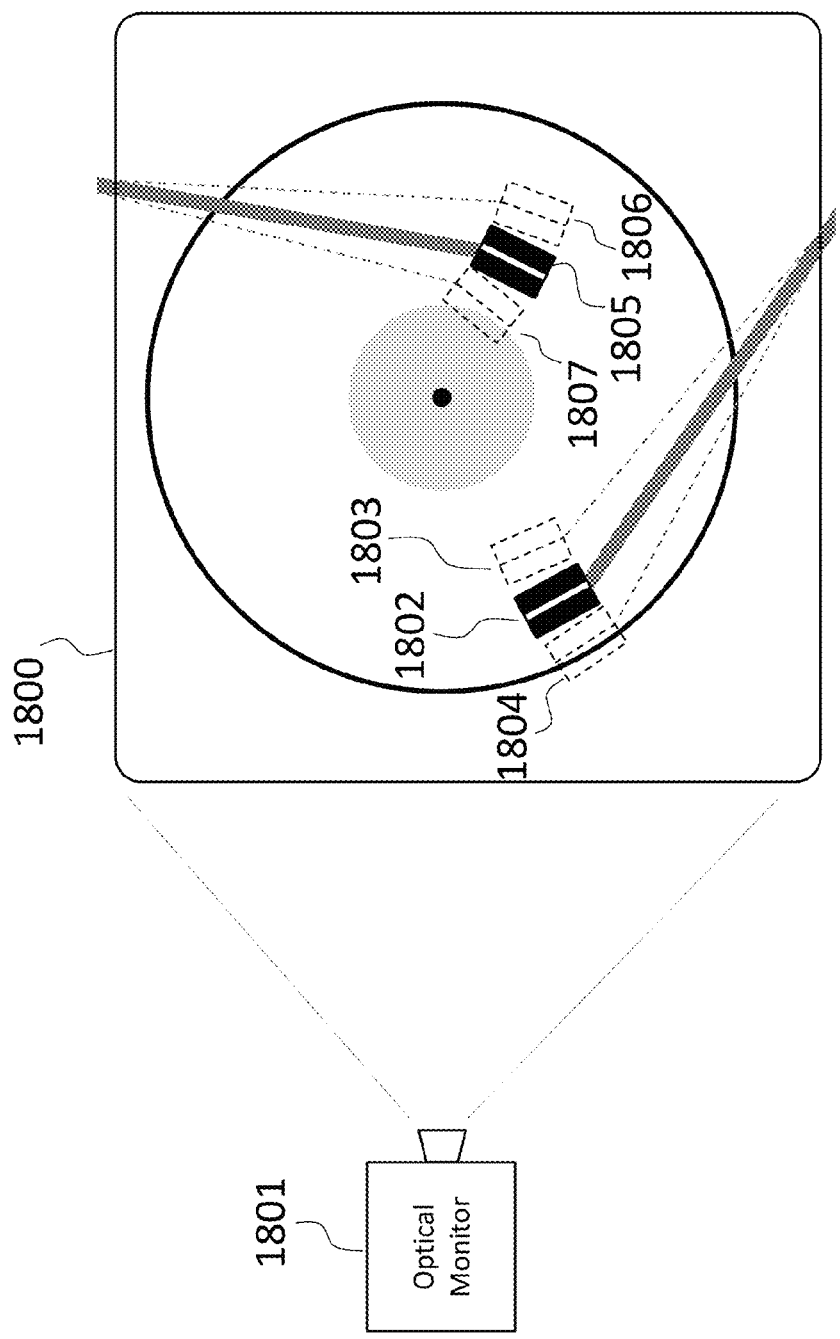

FIG. 18 illustrates the optical monitoring device, 1801 which is employed to monitor the positions of tonearms 1802 and 1805. As further labeled and detailed in FIG. 2 using the two tonearm embodiment as an example, the movement of the outer tonearm 1802 traverses the area from the lead-in groove across a pre-designated area from position 1804 to 1803. The inner tonearm 1805 traverses from position 1806 to 1807, exiting at the lead-out groove. An image recognition system of the invention monitors the tonearm position to provide precise position information to the control system of the invention for the purposes of initially positioning each tonearm of the invention then signaling when each tone arm has reached the end of its respective recording track.

Figure 19:
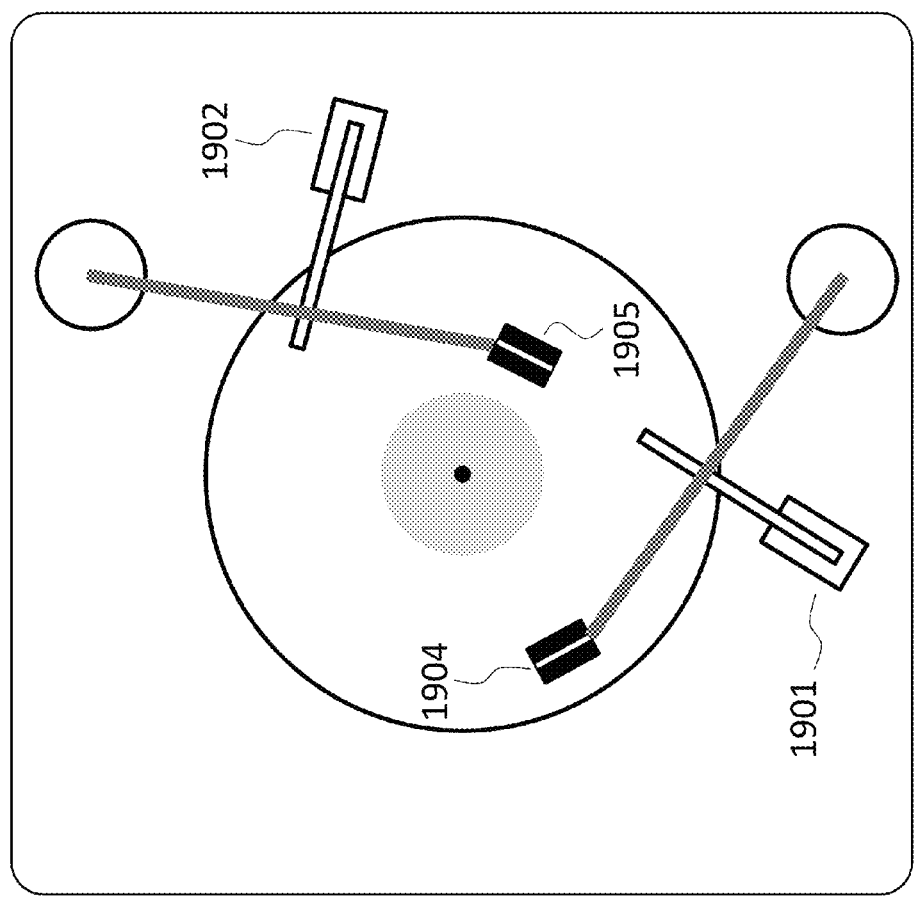

FIG. 19 provides a more detailed schematic of the mechanical tonearm lifting component of the invention. In this depiction of a two tonearm embodiment of the invention, the lifter 1901 engages the outer tonearm 1904 to and lifter 1902 engages the inner tonearm 1905 for the purpose of raising, positioning and lowering each respective tonearm.

Figure 20:
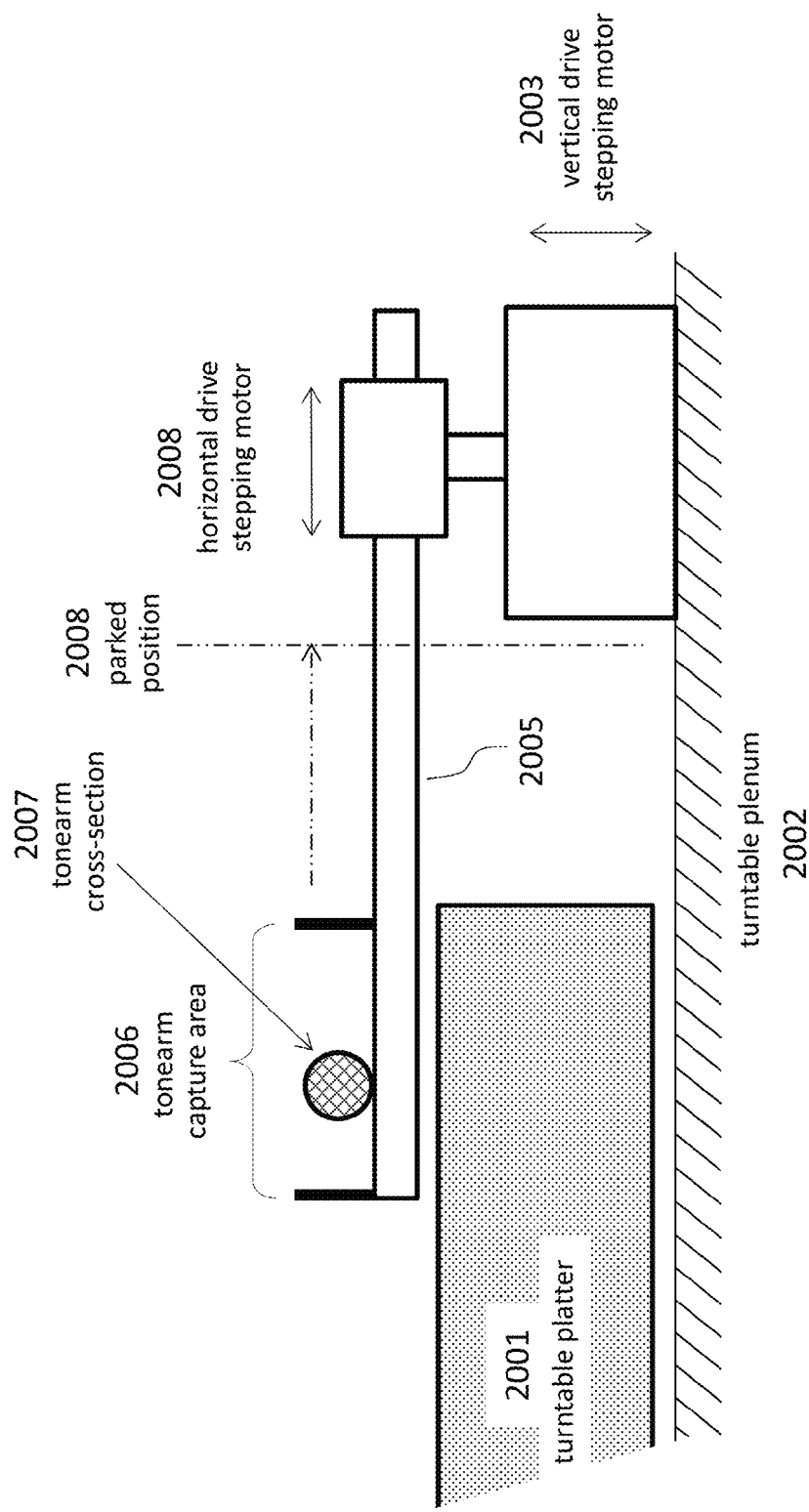

FIG. 20 is a further illustration of the mechanical tonearm lifter component of the invention. This is a cross-section view showing the turntable platter 2001 and the tonearm lifting means with its associated tonearm as retained by the mechanism of the apparatus (shown in cross section as 2007). The extension of the lifter arm 2005 is controlled by horizontal drive apparatus 2008, and its lifting and lowering of said tonearm is controlled by vertical drive apparatus 2003.

Figure 21:
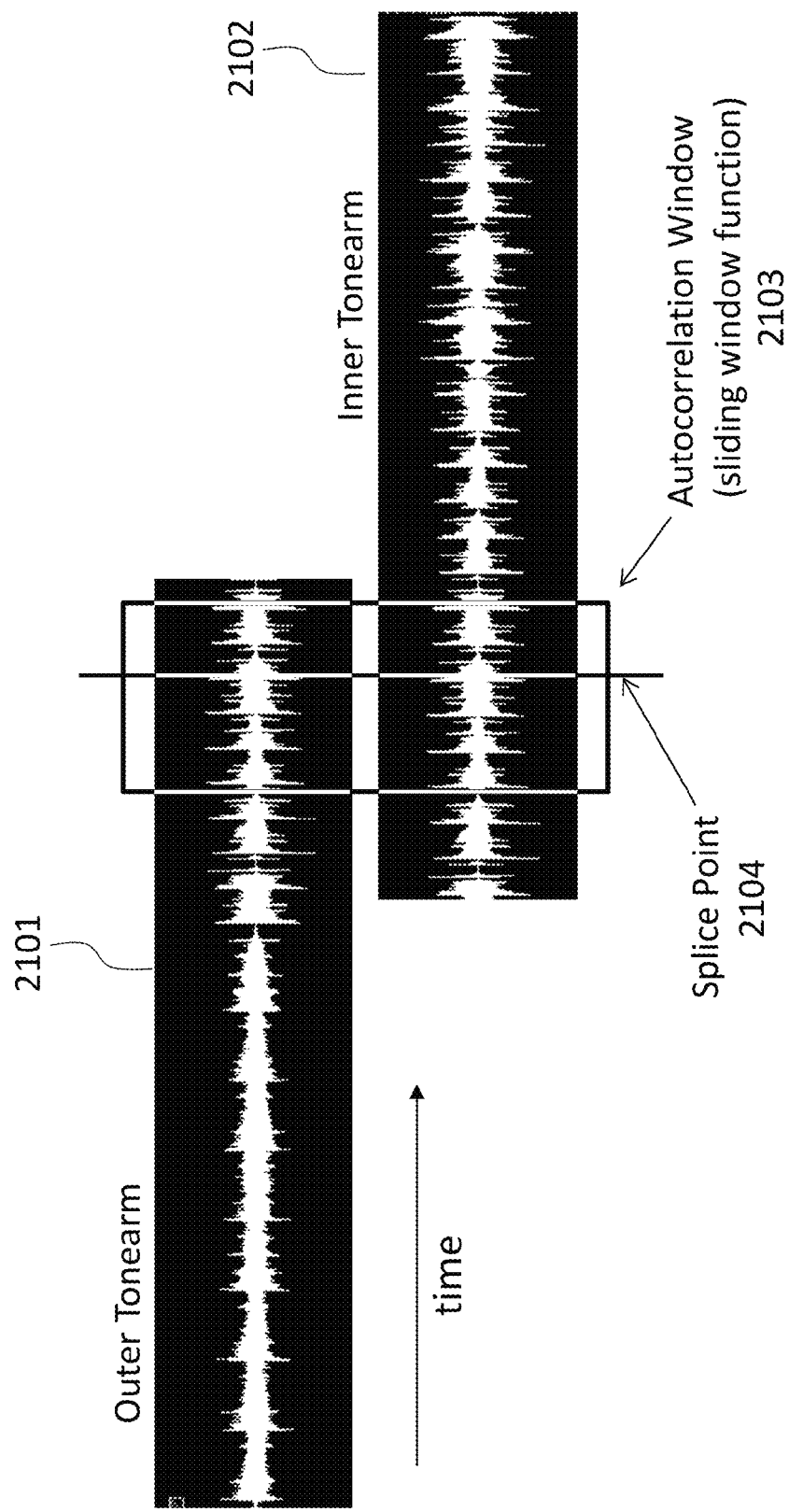

FIG. 21 illustrates the process of combining the audio signals 2101 and 2102 that are digitally recorded from each of the tonearms. In this example of a two tonearm embodiment, an autocorrelation method locates window 2103 in a region of precise overlap of, for this example, the end of the outer tonearm recording area with the start of the inner tonearm recording area. Using said autocorrelation method, a precise location is found in each audio recording track that becomes the splice point 2104 for stitching segments into one continuous file.

Figure 22:
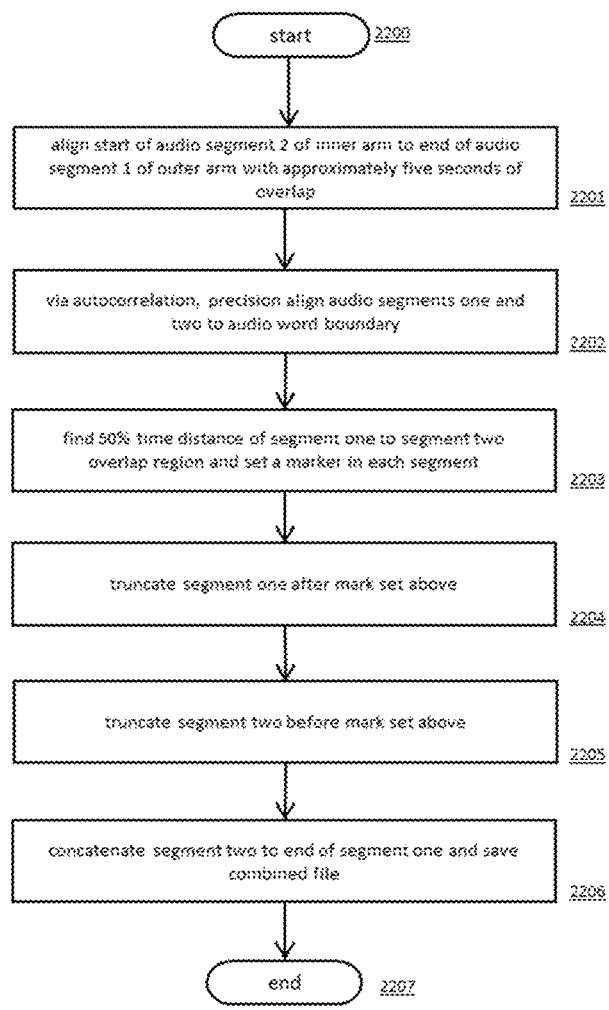

FIG. 22 is a flowchart which depicts an audio segment alignment process.

Figure 3:
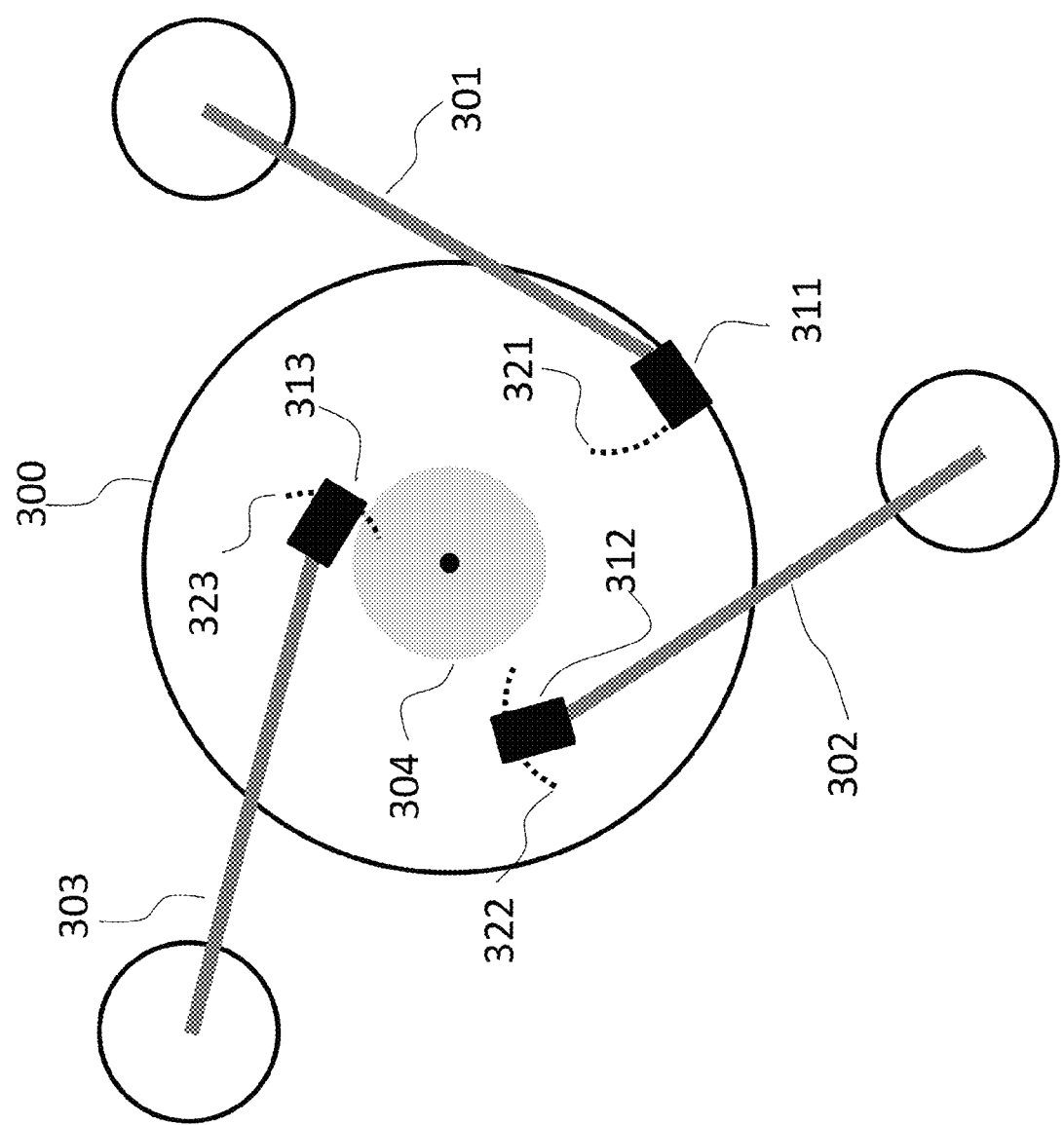
FIG. 3 is a drawing similar to FIG. 1, but modified to illustrate a three-arm embodiment of the invention with the three tonearms 301, 302 and 303 each pivoting independently and simultaneously following the groove track along outer arc 321, middle arc 322, and inner arc 323 respectively thus covering the recorded area between the lead-in to lead-out groove of a typical audio recording such as the vinyl LP.
Figure 4:
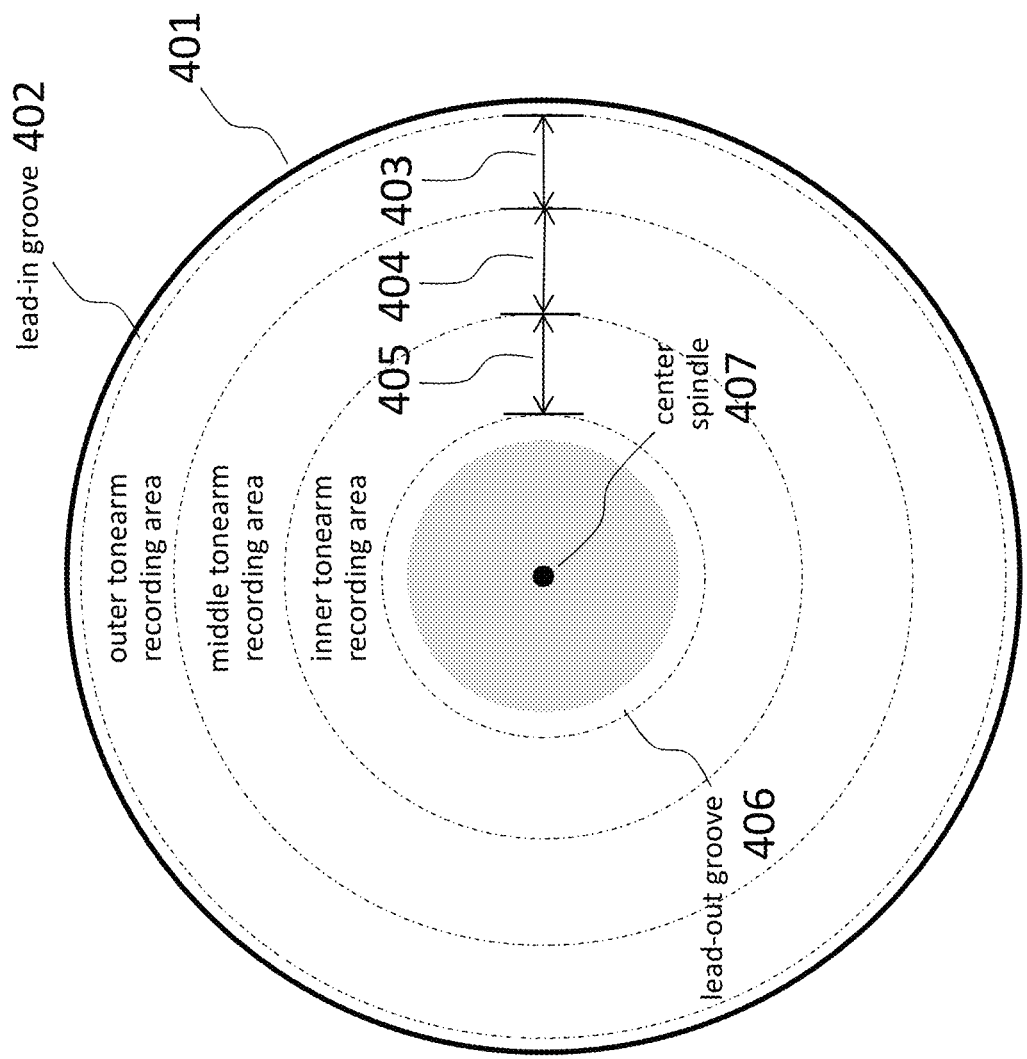
FIG. 4 is similar to FIG. 2 but modified to illustrate the areas of a vinyl LP record or similar recording as would be addressed by an exemplary three-tonearm embodiment of the Invention as illustrated in the preceding FIG. 3. The outer tonearm 301 in FIG. 3 enters the outer recording area at lead-in groove 402 and passes through to 403 recording area. Simultaneously, the middle tonearm 302 in FIG. 3, is lowered by the positioning means of the invention to enter 404 and tonearm 303 of FIG. 3 is lowered a few seconds outside of area 405 to play said area. Groove spacing is not uniform on phonograph recordings and, hence, each arm may reach the end of its sector at a slightly different time. The arm control means of the invention is programmed to lift and park each arm as each said sector is traversed by said respective tonearm.
Figure 23:
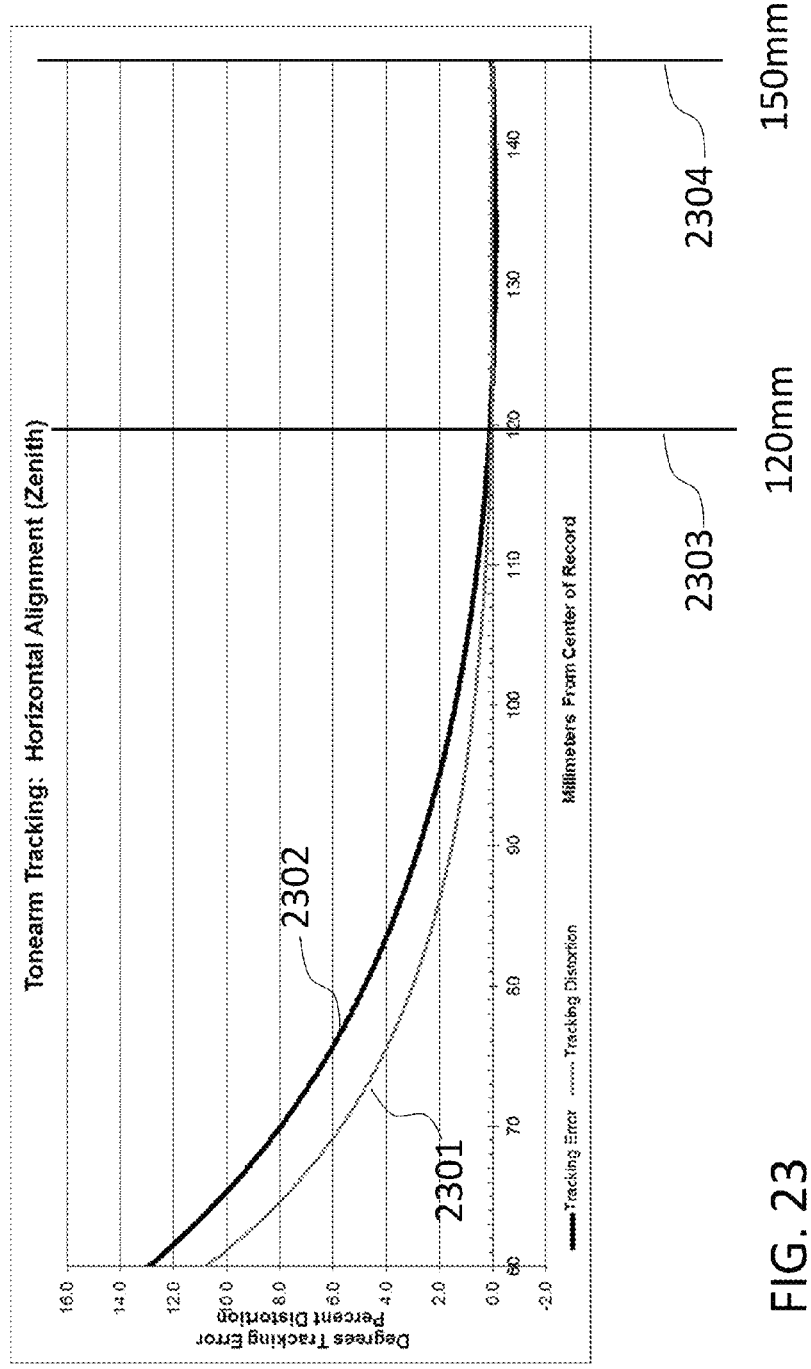

FIG. 23 is a graph of tracking error and harmonic distortion of a three-arm tonearm assembly of FIG. 3 playing the outermost section of a record at 403 of FIG. 4. In this example, the area between 2304 at about 150 mm, which is the lead-in groove, to 2303 which is a point that is located at a distance of 120 mm from the spindle. Observable is that the harmonic distortion is nearly zero.

Figure 24:
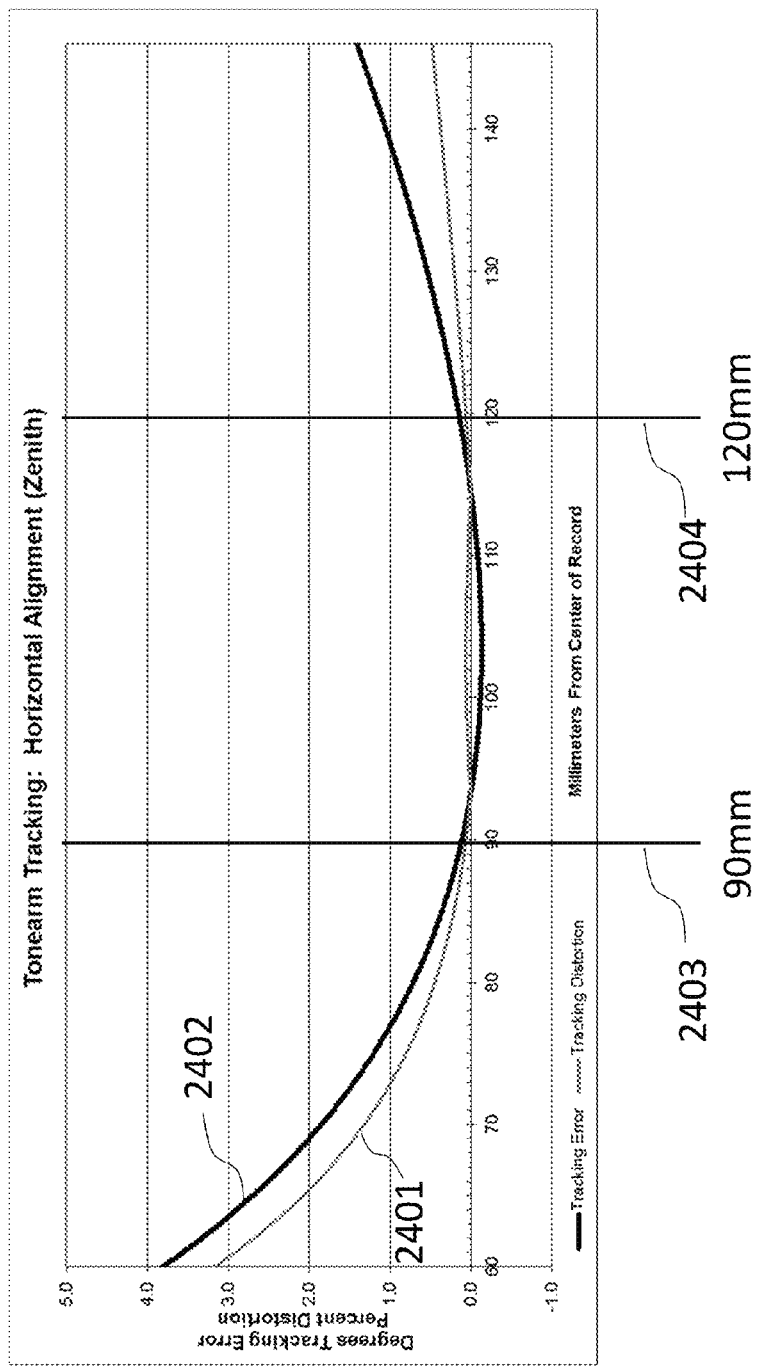

FIG. 24 is a graph of tracking error and harmonic distortion of a three-arm tonearm assembly of FIG. 3 playing the outermost section of a record section 404 of FIG. 4. In this example, the area between 2404 at about 120 mm to 2403 which is a point that is located at a distance of 90 mm from the spindle. Observable is that the harmonic distortion is close to zero.

Figure 25:
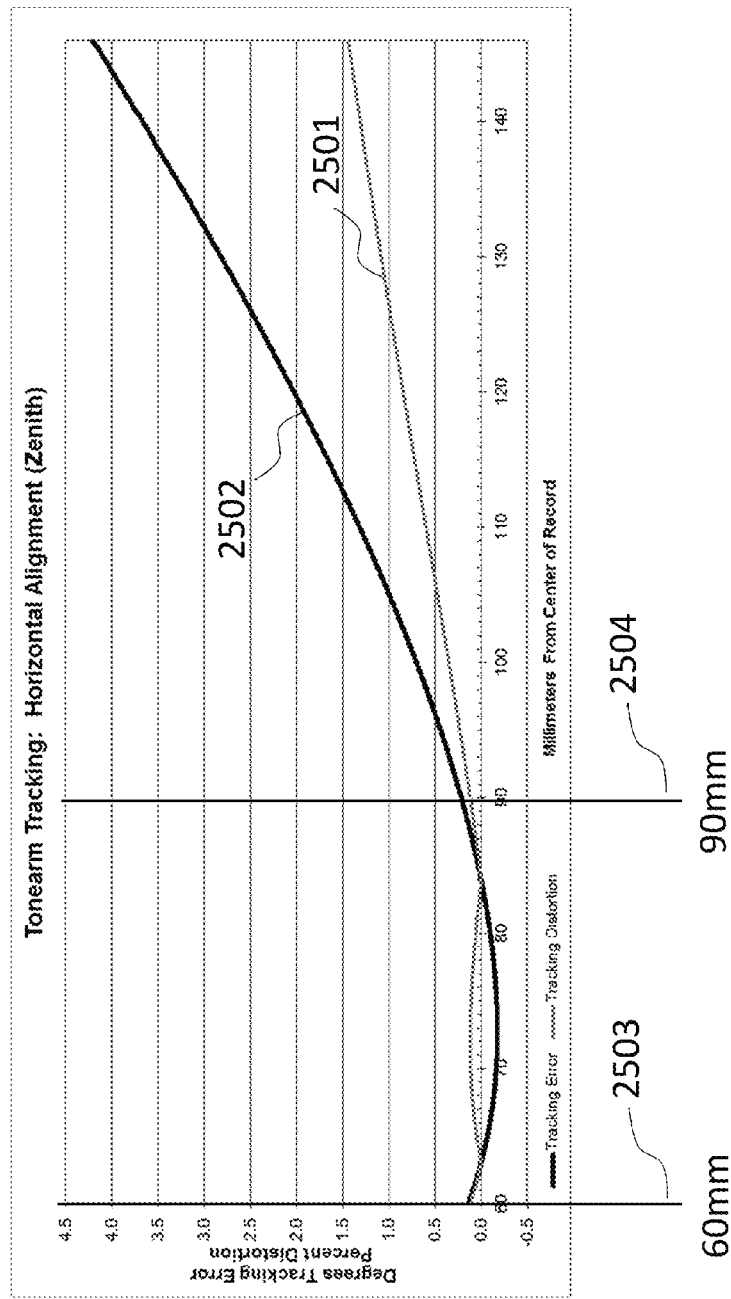

FIG. 25 is a graph of tracking error and harmonic distortion of a three-arm tonearm assembly of FIG. 3 playing the outermost section of a record at 405 of FIG. 4. In this example, the area between 2504 at about 90 mm, which is the lead-in groove, to 2503 which is a point that is located at a distance of 60 mm from the spindle, the lead-out groove. Observable is that the harmonic distortion is nearly zero.

Figure 26:
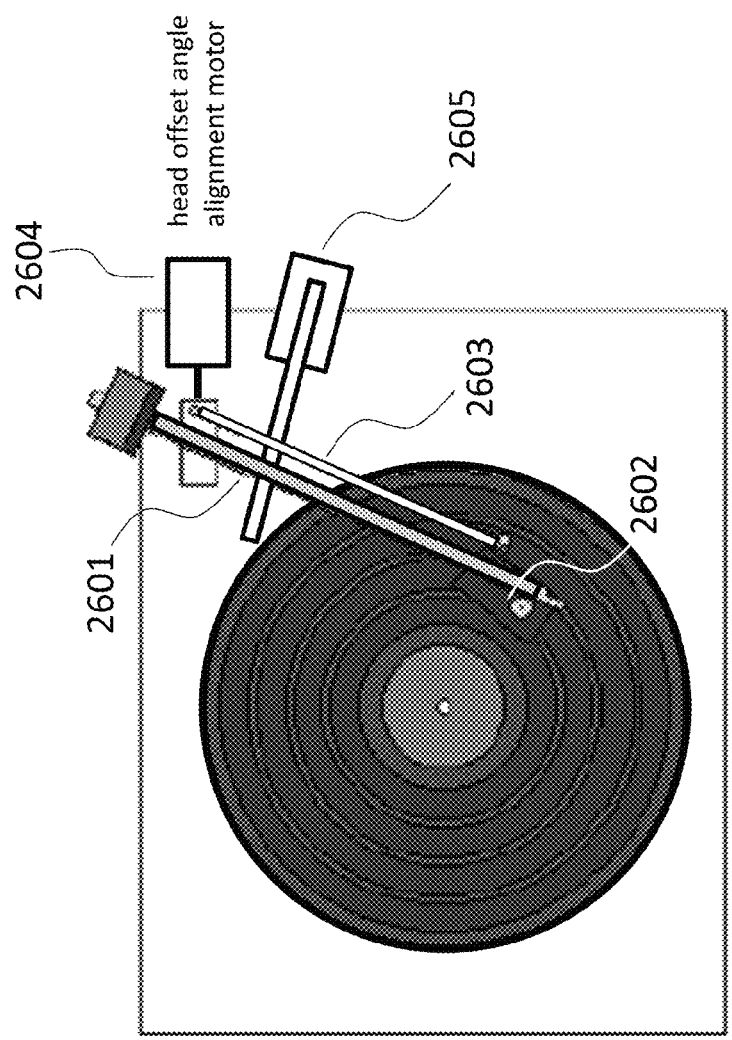

FIG. 26 illustrates an alternative embodiment of the Invention using a single, self-aligning tonearm 2601 that is configured to rotate the cartridge and stylus assembly in head component 2602 by means of an offset angle alignment motor 2604 manipulating the rotatable cartridge angle control arm 2603 in such a manner that the cartridge is maintained in an orientation that is essentially tangential to the grooves at all times depending on the section of the recording being played back. The lowering, lifting and positioning of the tone arm for each adjustment for each section of travel is automated by tonearm lifting device 2605 that operates in a manner similar to that as depicted in FIG. 20.

Figure 27:
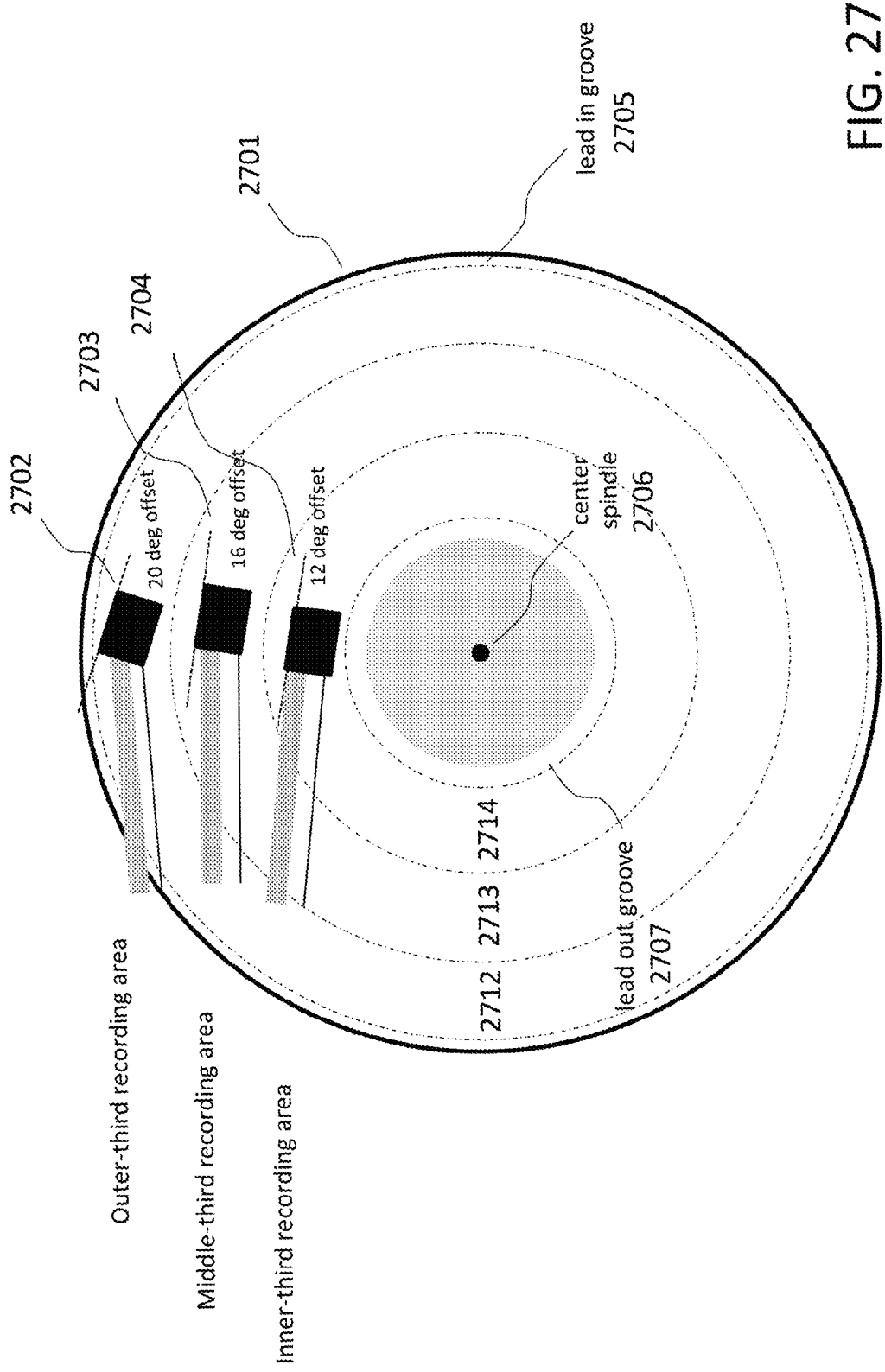

FIG. 27 illustrates the principle of the operation of the single self-aligning tonearm embodiment of the Invention. The recorded surface of the subject recorded disk 2701 is divided into a plurality of playback areas. In this example there are three: an outer, middle and inner area. However, in this example, rather than using the three tonearm embodiment of the invention as depicted in FIGS. 3 and 4, a single self-aligning tonearm embodiment is used. For each designated section of the recording area, the tone arm is positioned by the tonearm lifting device as shown as 2605 in FIG. 26 while the angle of the head component (2602 in FIG. 26) is adjusted by component 2604 in FIG. 26 to a position that is calculated as appropriate for that specific section as depicted by means of example only by angle 2702 of 20 degrees, 2703 of 16 degrees, and 2704 of 12 degrees. The corresponding overhand value of the stylus is also set to achieve the optimal tracking accuracy as taught by Baerwald, et al, for the appropriate null points of each playback section (outer 2712, middle 2713 and inner 2714 in this example).

Figure 28:
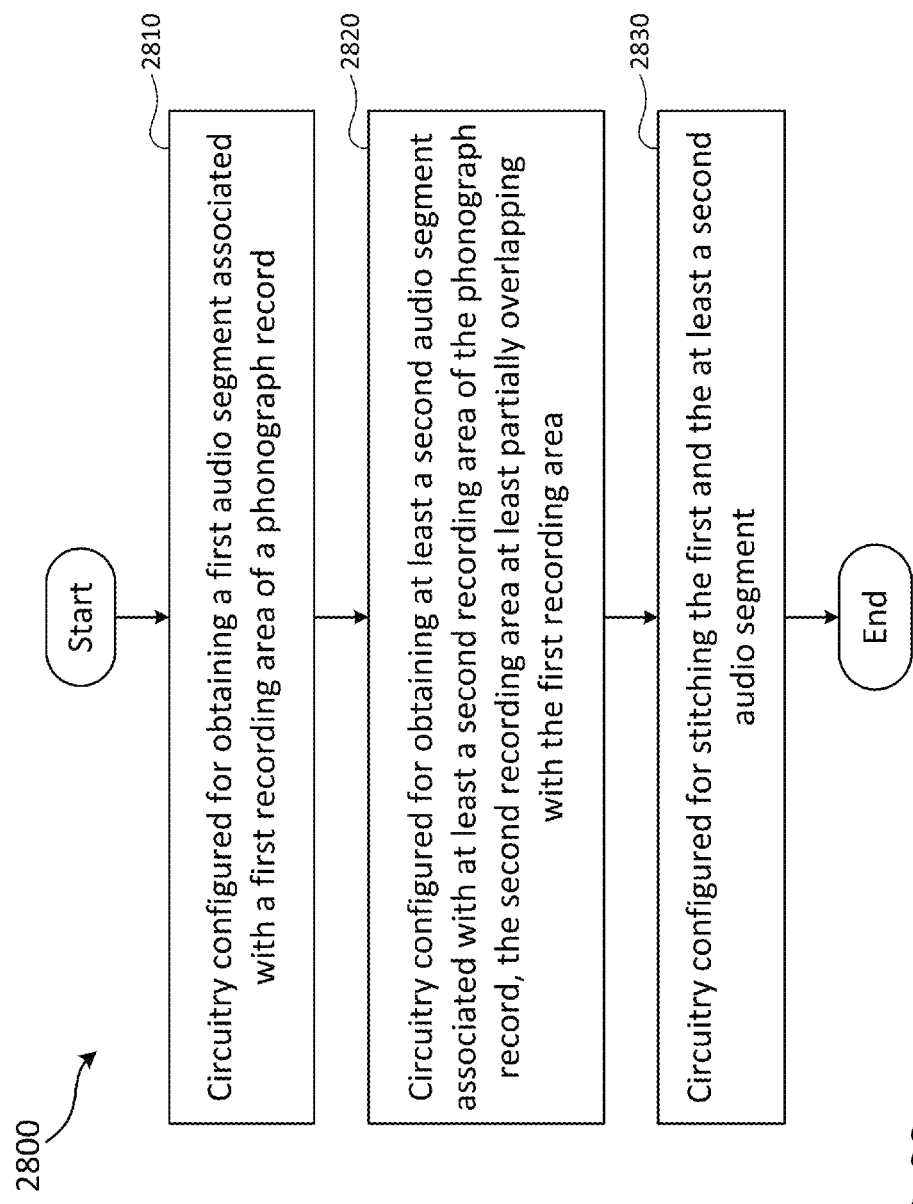

FIG. 28 illustrates an operational flow representing example operations related to playback of phonograph records.

FIGS. 29 to 35 illustrate alternative embodiments of the operational flow of FIG. 28.

DETAILED DESCRIPTION OF THE INVENTION

As audio recording, storage and playback systems evolved over the years, subtle noise and distortion artifacts secondary to the technologies then available became more and more detectable to certain classes of listeners. One of the most difficult of these issues to address has been the artifacts inherent in the conflict between the way audio information is recorded to analog audio disks, and the way it is then played back.

Figure 1:
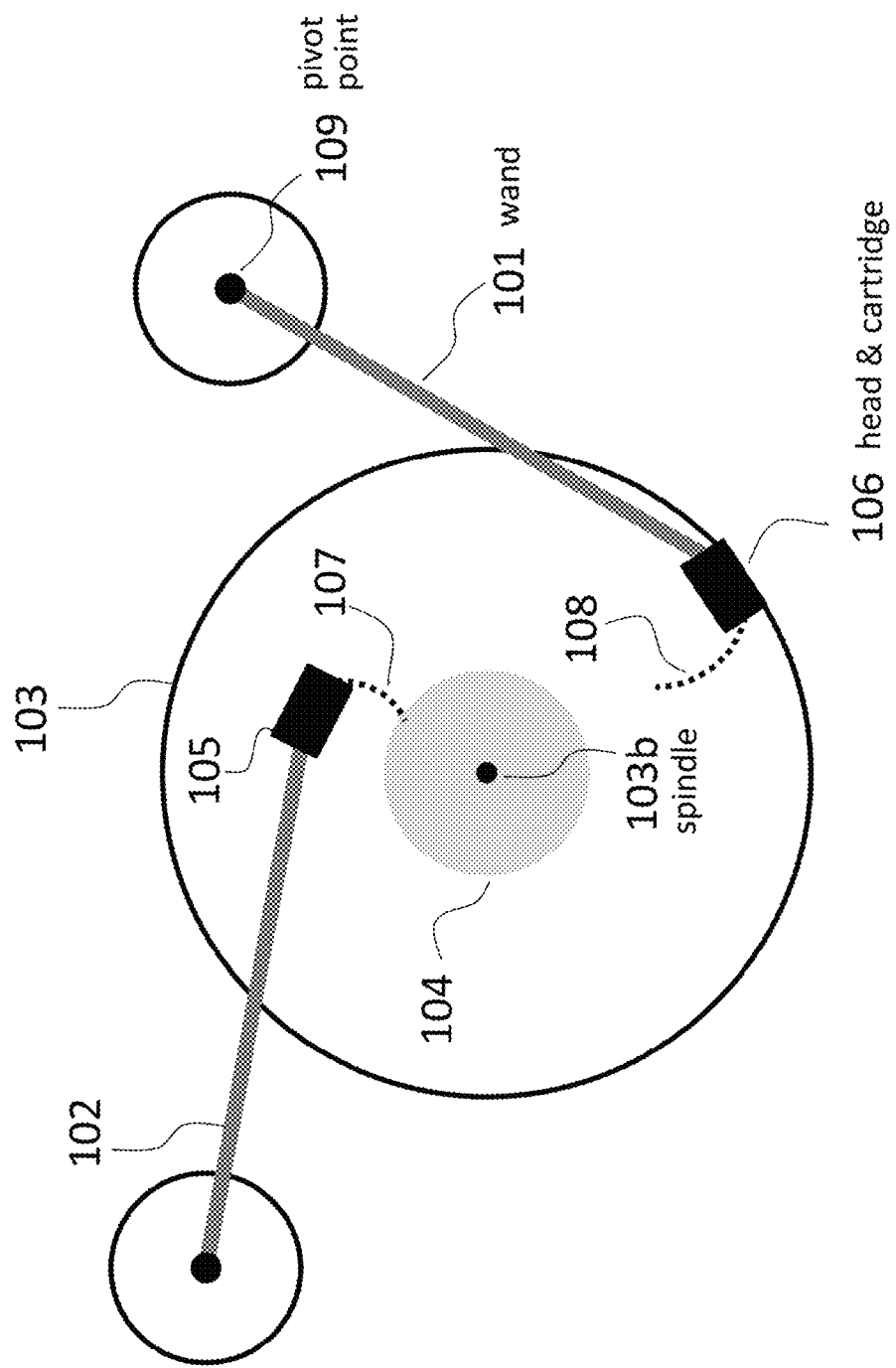
FIG. 1 is a drawing of an exemplary two-tonearm embodiment of the invention with the major mechanical components identified. The outer tonearm 101 follows track 108 traversing an arc across the outer one-half of the recorded surface of an audio record with some overlap of the second half. The inner arm 102 traverses the inner one-half of the recorded surface with some overlap of the first half.
Figure 1B:
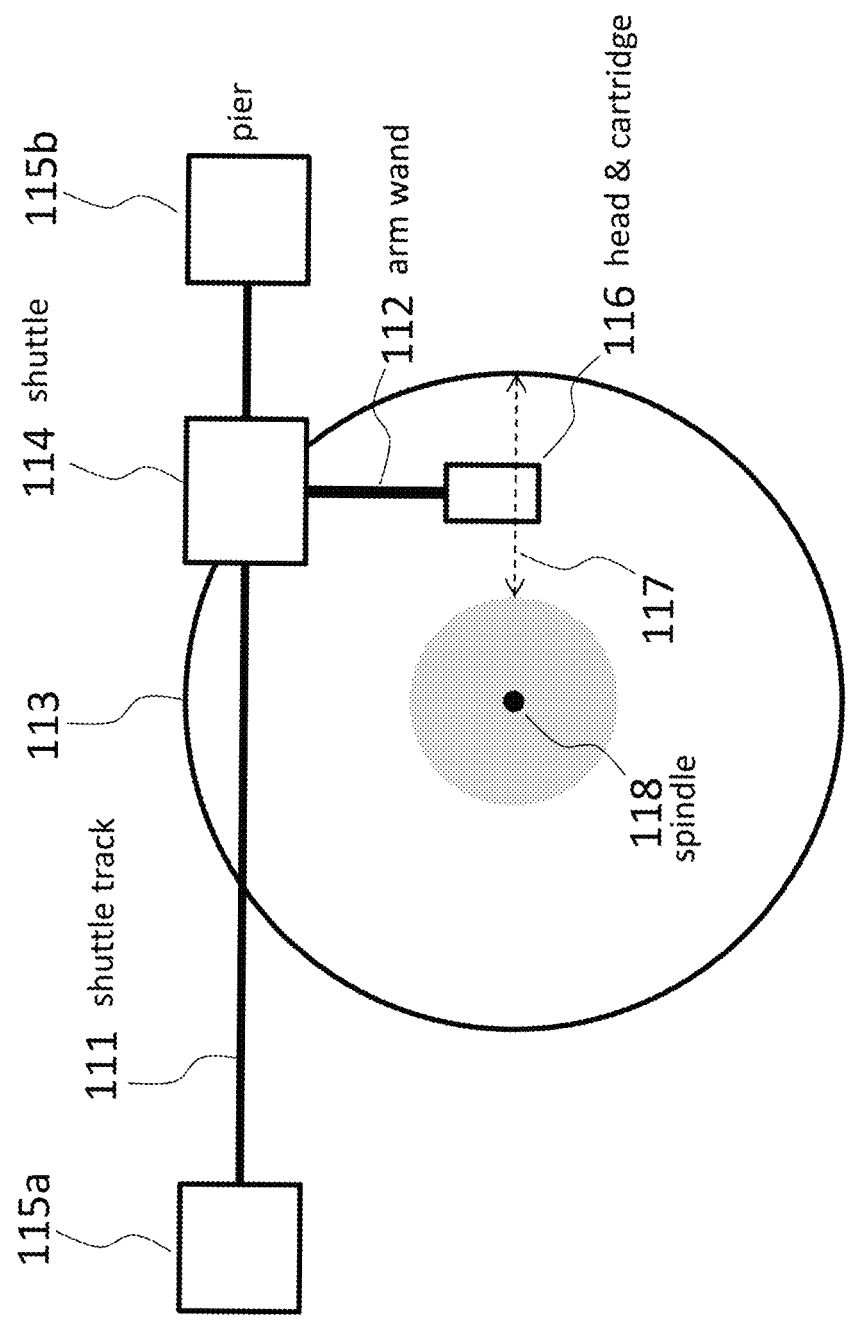
FIG. 1b is a simplified drawing illustrating the primary components of a linear-tonearm turntable, with shuttle track 111 transporting the shuttle 114 in a linear path across a phonograph disk placed on platter 113. This mechanism is supported by two piers 115a and 115b. The shuttle supports an arm wand 112 that in turn supports a head assembly with cartridge and associated stylus 116 aligned such that the stylus is transported in a direct radial path 117 across the surface of said recording, following the path taken by the original cutting head during the record mastering process.
Figure 5:
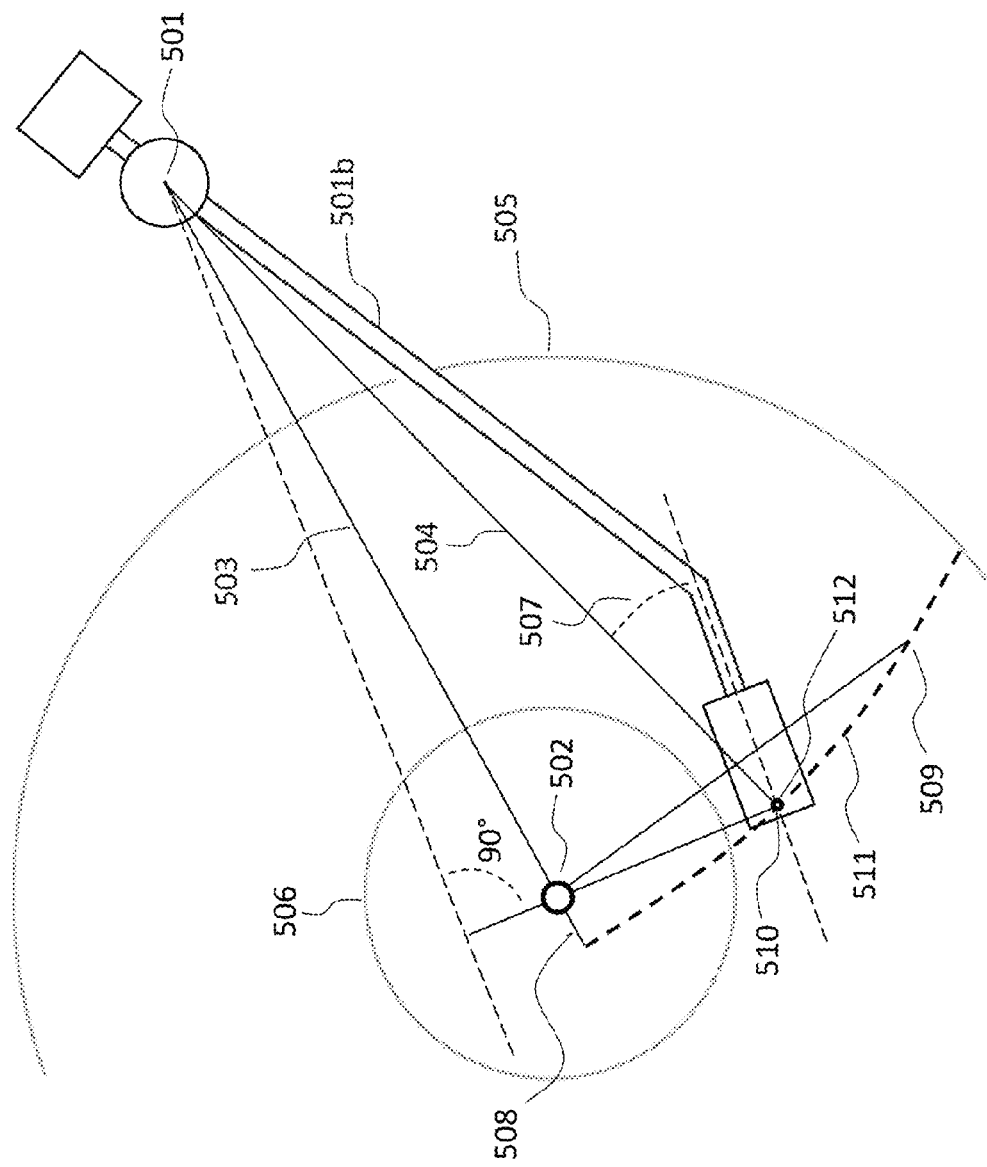
FIG. 5 is a drawing illustrating the terms of art used in describing the geometry of a pivoting tonearm and phonograph record. The tonearm pivots at point 501 and the distance from said point to the tip of the phonograph stylus 512 is the effective length 504 of the tonearm. Said length 504 and offset angle 507 determines the arc 511 traced by the stylus 512 as it traverses the recording. Overhang 508 is the distance from the spindle 502 to the arc of stylus 512 which is the distance that said stylus exceeds the distance to said spindle. The offset angle 507 is the angle that the cartridge sits relative to the tonearm. Distance 503, length 504 and angle 507 determine the arc that the stylus 512 traverses from the lead-in groove to the lead-out or inner-most groove. The application of overhang 508 and offset angle 507 cause the arc traced by stylus 512 to be exactly perpendicular to the groove wall at two points in the path. At the outer null point 509 and inner null point 510 the stylus is perpendicular to the groove and tracking distortion is minimal.

Vinyl phonograph disks are pressed from molds of a master disk that is cut by a mechanical lathe device; an example of which is shown in FIG. 24. The cutting head is driven by a worm drive across the surface of the disk, passing along a straight radial path from the outermost to the innermost groove as diagramed in FIG. 1b. A problem with playback tracking accuracy arises from the traditional pivoting phonograph tonearm that has been in use in one form or another for almost a century. As the stylus follows the groove, the tonearm pivots causing the stylus to traverse a path that is an arc with a radius proportional to the length of the tonearm among other factors. The geometry of the typical phonograph tonearm is illustrated in FIG. 5. The resultant path followed by the stylus is an arc that intersects the straight path traversed by the mastering process cutting head in only two locations, called "null points" as shown as 510 and 509 in FIG. 5. The rest of the time, the phonograph needle or stylus is unavoidably offset at an adverse angle to the information recorded by the cutting tool used to create the mastering record's groove. This so-called "tracking error" introduces audible distortion in the playback of audio records.

Much research in the first half of the twentieth century went into determining optimal geometry to minimize said tracking error and attendant distortion, see Ref 1. Lofgren, Ref 2. Baerwald, Ref 3. Bauer. The general consensus from this research resulted in recommendations to set an angular offset 507 of the cartridge to the tonearm wand 501b and to establish an overhang 508 where the stylus point 512 follows an arc of a radius greater than the pivot to spindle distance 503, as identified in FIG. 5. The mathematical formulas to determine these settings as depicted in FIG. 6 were established by the authors of the aforementioned references, among others.

Figure 7:
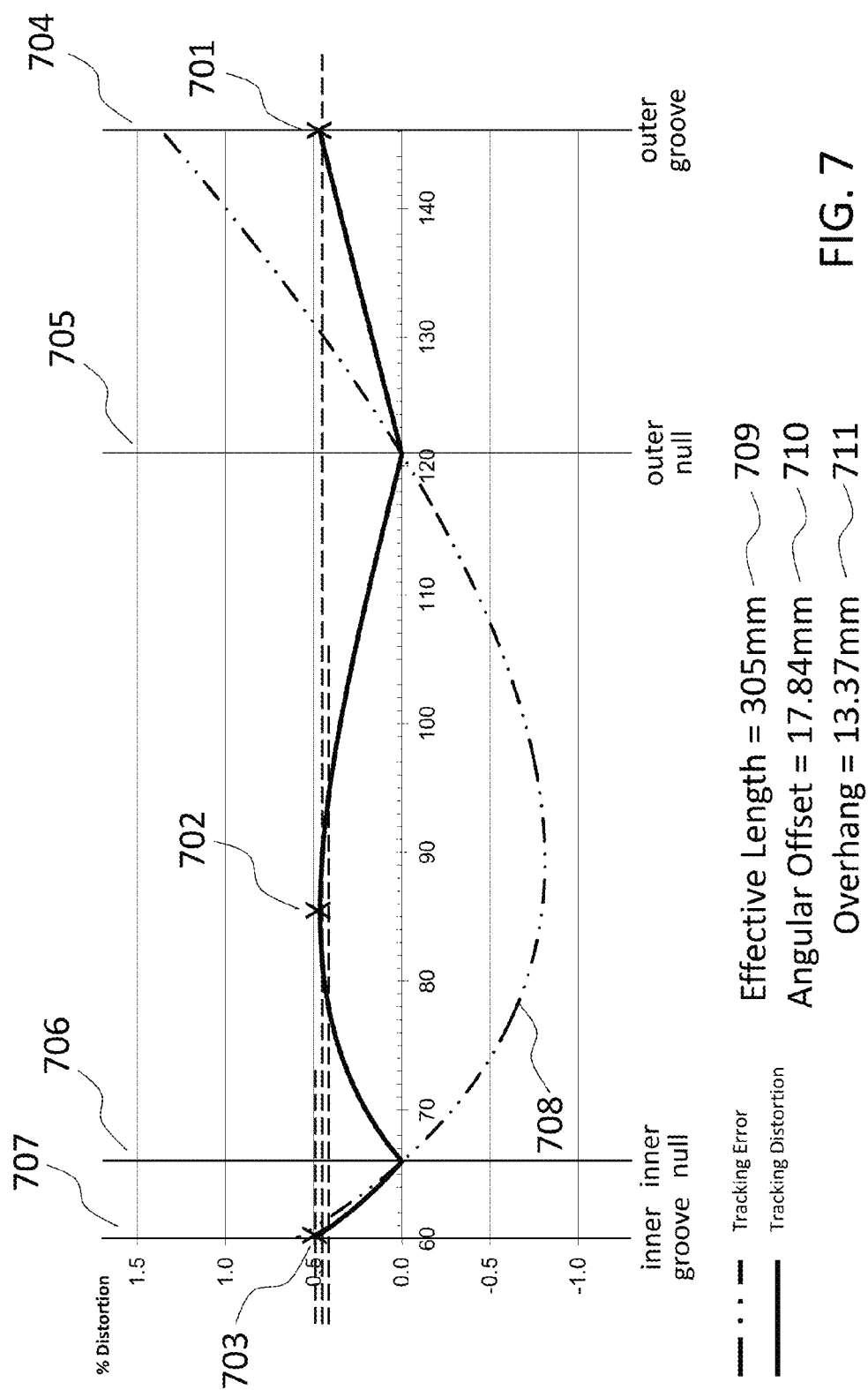
FIG. 7 is a graphic representation of the tracking error 708 and harmonic distortion 702 associated with a "Baerwald" single tonearm configuration and alignment as defined by parameters 709, 710 and 711 computed with the aid of the formulas of FIG. 6. As previously noted, the originator of this alignment scheme, Erik Lofgren, published a paper in 1938 that defined the relationship of the tonearm cartridge to the surface of a recorded disk for the purpose of minimizing audio distortion in the playback of audio due to tracking error 708. The Lofgren A alignment causes the peak distortion 703 of the lead-in groove position to be equal to the peak distortion 702 of the area between the two null points 705 and 706 and the final lead-out groove 701 of the recorded information.
Figure 8:
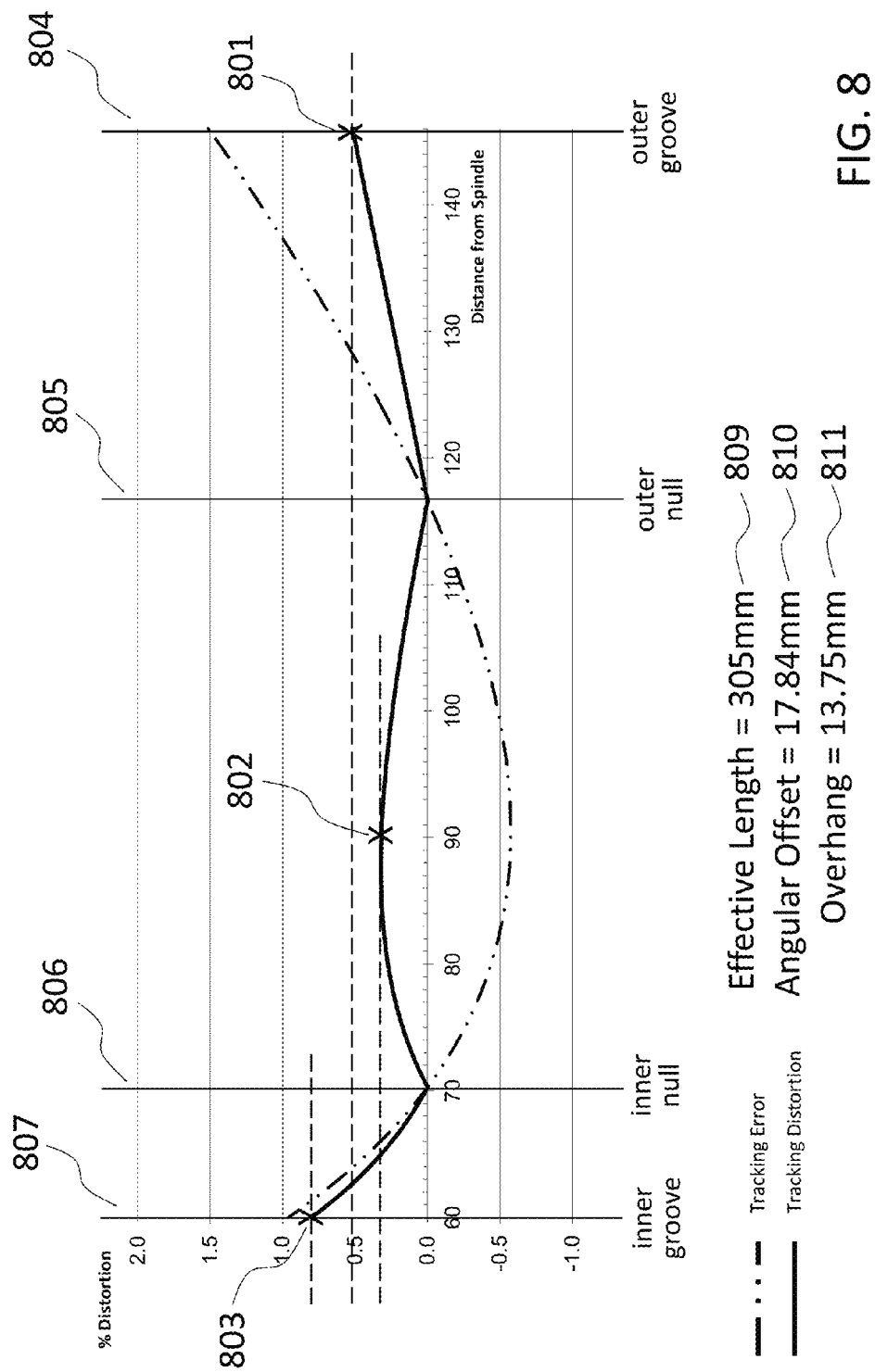
FIG. 8 is a graphic representation of the tracking error and distortion associated with another single tonearm configuration known as "Lofgren" showing the substantial change in tacking distortion 802 associated with a small change in only one of the three parameters, specifically the "Overhang" as shown in 508 of FIG. 5. In Lofgren, the average (RMS) distortion is equal from the lead-in 804, to the first null point 805, the middle section 802, and the lead-out, 801.

Applying the formulas in FIG. 6 can change the degree to which the tracking error occurs, as shown in comparing FIG. 7 and FIG. 8. These two figures graph the tracking error and resulting harmonic distortion generated as a result of the tracking error. Because of the complex interactions of the multiple geometric shapes and relationships in play, a very subtle change in tonearm geometry can result in significant alterations in tracking errors and distortion. This can be readily seen by again comparing FIG. 7 depicting an example of what is known as the Baerwald geometry. This configuration is one of the most popular tonearm configurations in use with contemporary turntables. In this alignment, the peak harmonic distortion is plotted at three points where 701 is the outer groove, 702 is the peak of distortion found about two-thirds of the distance toward the end of the recording from the outer groove and 703 is the distortion at the end of the recording. The intent of this Baerwald configuration is to adjust said overhang and said offset angle such that said distortion is equal at each of said three peak points. The graph of FIG. 8 plots another popular geometry known as Lofgren. In this configuration, the root-means-square (RMS) average of distortion is equal in each of three areas of the recording. Said areas are from the lead-in groove 801 to the outer null point 805 is the first section, then between outer 805 and inner 806 null points and finally between inner null 806 and lead-out groove 807. The result of this configuration is the harmonic distortion is minimized for most of the recording surface at the expense of the beginning and the end of said recording. Some audiophiles and recording engineers prefer Baerwald and others prefer Lofgren. There are several other configurations that have some popularity. In all of the useful configurations, a less than 3% change in just the metric describing the overhang of the cartridge, results in changes in said distortion characteristics as a direct result of affecting the tracking error.

However, no matter how carefully the pivoting tonearm is calibrated, it is geometrically impossible to make any arc intersect with a straight line except at two points and, hence, no configuration can achieve uniformly low tracking error from a pivoting tonearm.

In an attempt to address this issue, various types of what are known as linear tonearms have been proposed. These playback systems, similar to one pictured in FIG. 25, seem an ideal solution at first glance. Unlike with a pivoting tonearm, the cartridge with its stylus moves along a path essentially identical to the path traversed by the mastering lathe system's cutting head. Said tracking error of said playback system should be zero.

Though track error is indeed minimal, unfortunately the various implementations of the design of linear tonearms have been compromised by other mechanically induced problems result in new sources of distortion and noise. One source of distortion is from the shuttle assembly 2501 in FIG. 25. This shuttle cannot guide the cartridge and needle across the record with perfectly even friction as said assembly moves across the surface of the phonograph record. The most audible side effect is caused by the side-loading pressure exerted against the stylus by the groove wall. Said pressure is the only force available to move the entire assembly of the shuttle, tonearm and cartridge of said linear tonearm implementation. Said pressure is conveyed from the stylus up the flexible cantilever to the cantilever mount in the phonograph cartridge then up the tonearm to the shuttle. It is important to understand that the original record cutting lathe used a precision worm drive to propel the cutting head assembly across the radius of the recording area and, hence, the cutting needle was free to cut a precise and tangentially perfect representation of the instantaneous audio information. The cutting needle, hence, had no propulsion duties to interfere with its job of impressing the analog audio information into the groove walls of the record.

Figure 9:
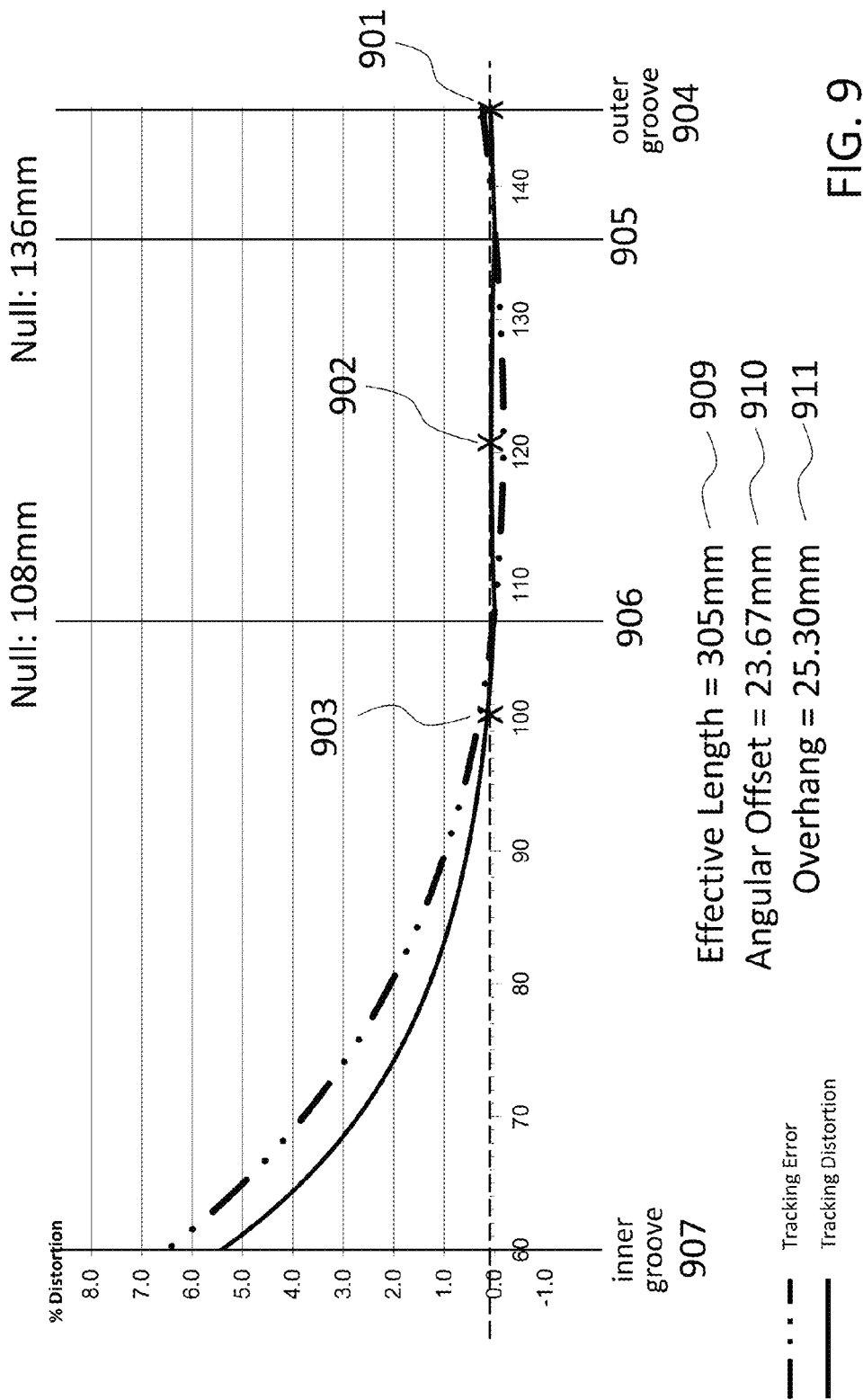
FIG. 9 is a graphic of the tracking error and distortion associated with one of the preferred alignments and configurations of the outer tonearm of an example dual arm embodiment. Note that since tracking error and distortion for the inner area of the recorded surface between approximately 901 and 907 are no longer relevant to the user experience, the three parameters of Effective Length 909, Angular Offset 910, and Overhang 911 may be adjusted to minimize the average tracking error and distortion for a shorter path resulting in the tracking distortion for the area between 901 and 903 to be much lower than a single arm tracing the entire surface of 901 to 907.
Figure 10:
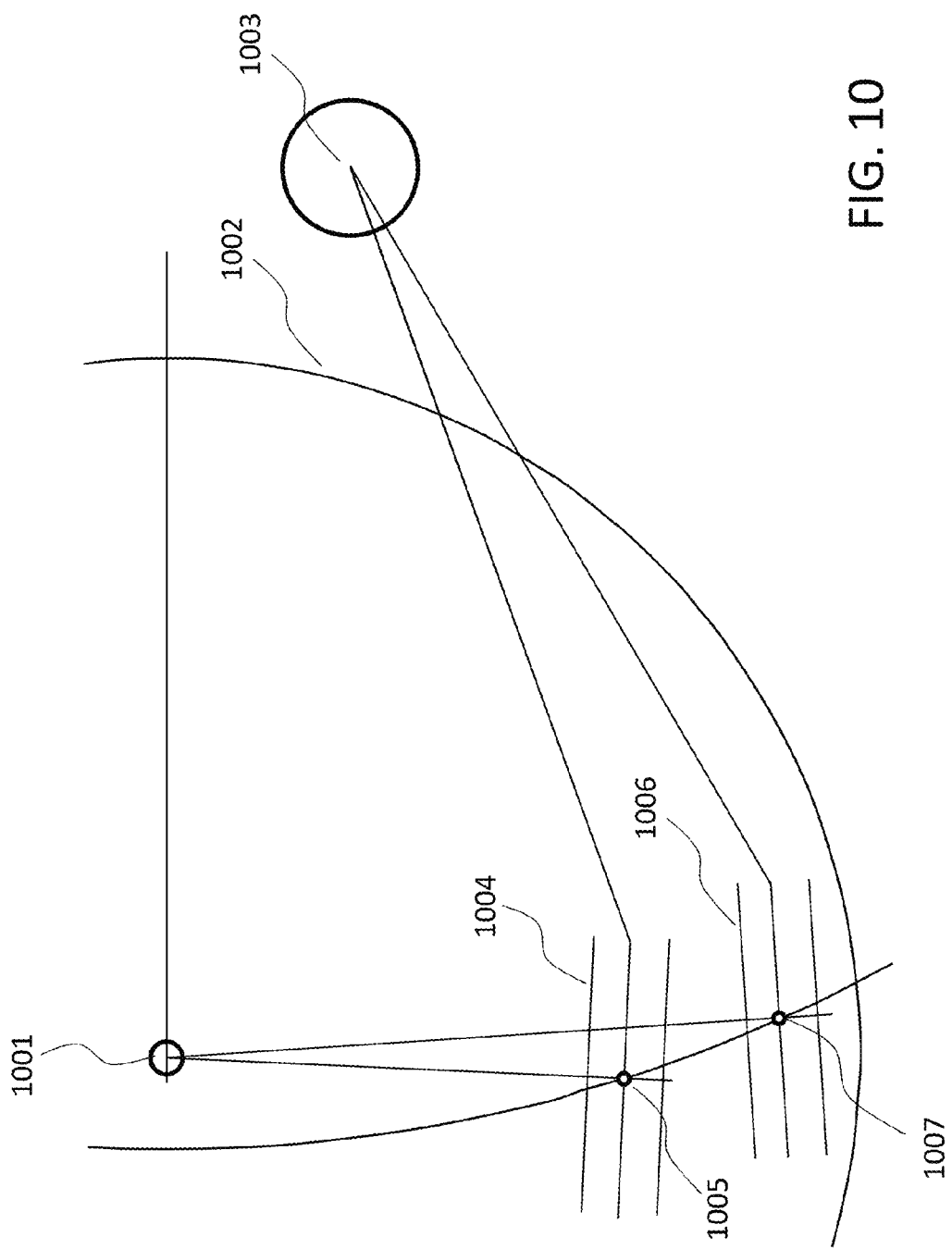
FIG. 10 is a template used to calibrate the outer tonearm of an exemplary two-arm embodiment. A hole is punched at 1001 for the turntable spindle. The template is cut-out along circumference 1002 and a placed over the spindle and aligned with tonearm pivot 1003. The stylus is placed in the 1006 grid and the cartridge shell is rotated to be parallel to the grid lines. The cartridge head is moved out or in such that the stylus touches point 1007. The tonearm is then swung to grid 1004 and the process checked for the stylus touching point 1005 and the cartridge shell remaining parallel to the grid lines. Upon achieving alignment, the cartridge is tightened to lock the calibration and the tonearm is ready to be used for the outer sector playback of a phonograph record with minimum tracking error and concomitant distortion.
Figure 11:
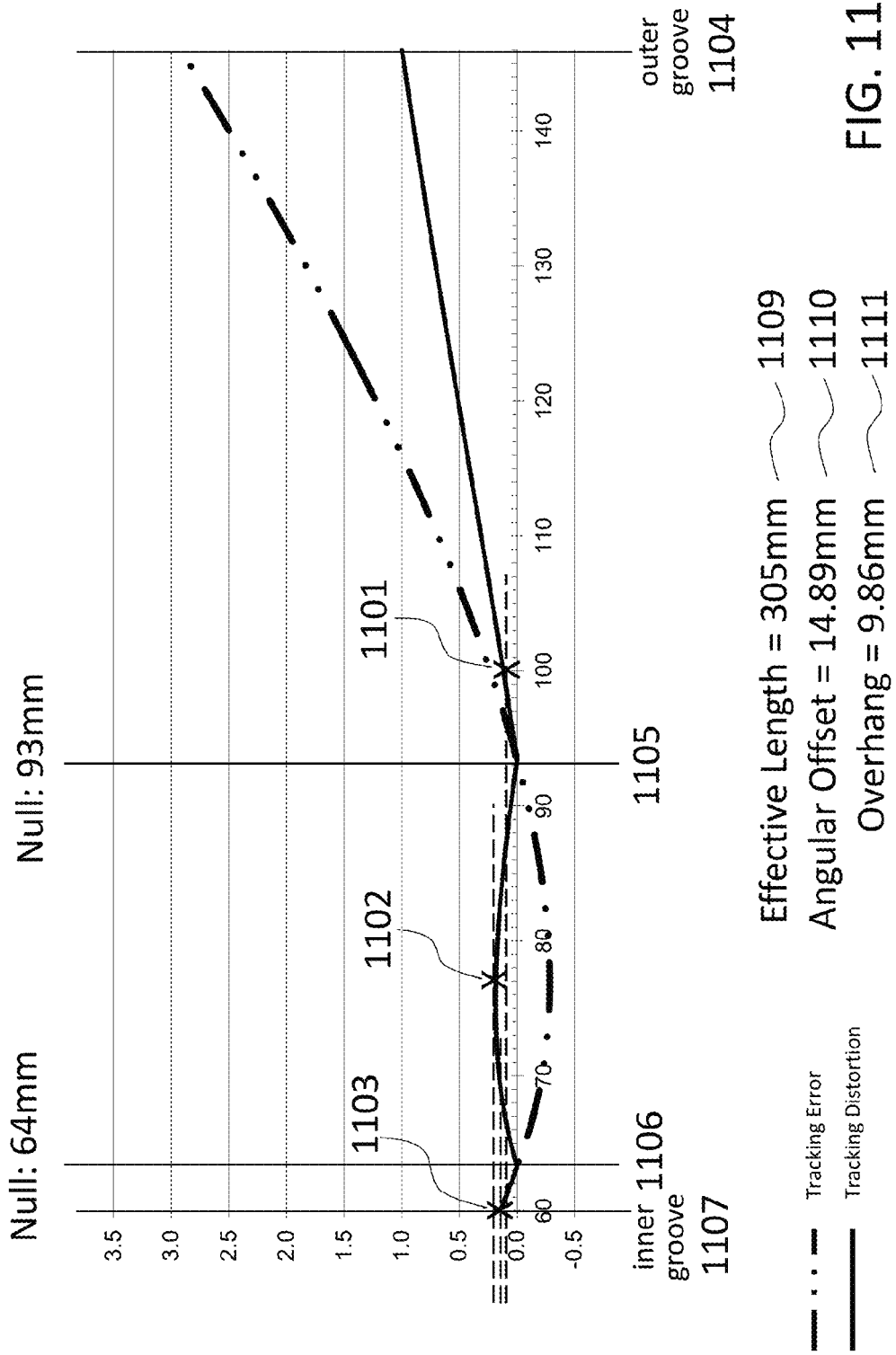
FIG. 11 is a graphic of the tracking error and distortion associated with one of the preferred alignments and configurations of the inner tonearm of an example dual arm embodiment. Note that since tracking error and distortion for the outer area of the recorded surface before point 1101 are no longer relevant to the user experience, the three parameters of Effective Length 1109, Angular Offset 1110, and Overhang 1111 may be adjusted to minimize the average tracking error and distortion for a shorter path resulting in the tracking distortion for the area between 1101 and 1103 to be much lower than a single arm tracing the entire surface of 1101 to 1107.

Therefore, to be able to create optimal high-resolution digital recordings from traditional vinyl or similar phonograph records, there is a clear need for a method and apparatus that can reduce tracking error distortion to below perceptual levels while not introducing yet other source of noise artifacts. By equipping a phonograph turntable playback system with multiple tonearms, the methods of the invention minimize the length of the mathematical arc that each cartridge's stylus inscribes relative to the path taken by the original cutting head on the record mastering process. The systems of the invention further detect and optimize the area of the arc with the least tracking error and distortion for each of the tonearms of the invention. For a two-arm embodiment, FIG. 9 shows a plot of tracking area and resulting low harmonic distortion in the area of recording from position 901 to position 903. The protractor diagrammed in FIG. 10 sets the geometry for the outer tonearm to achieve the desired characteristics for this region of the phonograph record. Likewise, FIG. 11 represents a plot of the tracking area and resulting low harmonic distortion in the area of recording from position 1101 to position 1103. The protractor diagrammed in FIG. 12 sets the geometry for the inner tonearm to achieve the desired characteristics for this region of the phonograph record.

The most optimal tracking results from the different tonearm configurations at different portions of the arc are then mathematically identified and may be combined into one minimally-distorted result as shown in FIGS. 13 and 14. The invention can be optimally utilized with all tonearms of the particular embodiment recording simultaneously. The invention provides a means to digitally record the output of each tonearm. Once recorded, the system of the invention then identifies an appropriate match point within the overlap of two adjacent digital recordings as shown in FIG. 21, using auto-correlation for example.

FIG. 15 illustrates a semi-automated system and apparatus that realizes the invention as an integrated, fully-operating system. Though showing an example embodiment with two tonearms, systems with more than two tonearms are equally applicable. The upper limit is simply where the tonearms have space to operate without touching one another. In FIG. 15, the two tonearms, 1502a and 1502b, are mechanically positioned as well as lifted and lowered by a motorized means of 1512a and 1512b. A more detailed view of said motorized means is shown in FIG. 20. In this embodiment, an optical sensing means, 1511, is used to guide the tonearm positioning means as well as to detect start and stop points of the recording arc of each pivoting tonearm. This optical means is typically a video camera, which provides a continuous video image to the recording system controller (RSC) means, 1505. The RSC is a computer subsystem that, among other things, employs optical recognition means to detect tonearm position and to provide trigger information to another subsystem for controlling tonearm management (lifting and positioning as further shown in FIG. 20.) Yet another subsystem of the RSC is computer numerically controlled (CNC) system to provide control of the motor assembles used to lift, lower and position the tonearms. Further, the tonearms could be manually controlled by a human operator but at a great loss of efficiency and possible increase in mechanical errors.

Video camera 1511 can also provide utility by providing a picture of the vinyl LP record surface so that a control system of the invention operating in the RSC can identify the individual tracks of the record, when present, to be supplied to a subsequent control module that finds and tags the individual audio bands on said record. This tagging scheme is by means of identifying and measuring the position of the silence between bands of a record where said silence is typically visual to the unaided eye as dark strips between songs. Additionally, camera 1511 can provide video information to a speed control module program which measures rotation of the turntable platter and can provide a servo control of the turntable motor to maintain precise rotation speed (typically 33⅓ or 45 rpm.) Yet additionally, camera 1511 can be utilized to take a picture of the record label to supply an optical character recognition means of the RSC to extract metadata from said label to identify the tracks of an audio recording. Camera 1511 can also provide visual information to a digital identification means to find and record the lacquer identification code which provides the provenance of the respective disk's master recording.

It should be understood that an advantage of the invention of using mechanical position means such as the computer controlled positioning mechanism of FIGS. 19 and 20 in conjunction with the optical position recognition system of FIG. 18 is to provide optimal playback quality by abstaining from employing any additional friction inducing sensory mechanisms to detect the tonearm positions both for entry into the respective playback area as well as to detect the point at which the tonearms are to be withdrawn. In prior phonograph playback systems that employ automated tonearm lowering and raising, mechanical means of sensing the tonearm position are employed causing non-uniform pressure on the tonearm and adversely affection playback audio quality.

Each phonograph cartridge of the invention is connected to an amplification means 1503a and 1503b, which is then connected to respective analog-to-digital converter (ADC) 1504a and 1504b. The digital audio output of the ADC is then captured and stored by the digital audio recording subsystem 1506 which then tags (identifies) and stores the resultant recordings. FIG. 15a depicts an alternative embodiment where the system of the invention employs only one analog-to-digital converter 1524 made possible by the addition of an analog signal switch 1526 which is controlled by the Recording System Controller 1525 to select one at a time of the plurality of input signals from each respective tonearm. In this example, the system selects from one of two tonearm assemblies, 1523a and 1523b. The system of the invention then records sequentially the output of each of the plurality of tonearms for further processing.

The next stage of processing is the Digital Audio Noise Reduction System 1507 which analyses the recorded audio to remove clicks and pops from the audio by digital signal processing. This is followed by the Digital Audio Stitching System 1508 which uses the splice point data supplied by RSC and then determines the precise byte aligned splice point to join two files. The process is repeated for each recorded sector resulting in one file representing the recorded digital audio of the respective side of the audio record. FIG. 21 illustrated two sample audio segments of overlapping sections of a phonograph recording. The audio signal 2101 depicts the end of the recording of the outer tonearm such as the area of playback 203 of FIG. 2. The audio signal 2102 depicts the overlapping recorded area of the inner tonearm of playback area 204 of FIG. 2. By means of an auto-correlation signal processing algorithm, the overlapping areas of 2101 and 2102 are precisely aligned even though each signal was derived from a separate tonearm. If examined closely, each overlapping area would be digitally converted with differing information due to random noise of the system as well as such factors as differing dirt accumulated on each respective playback stylus. However, the mathematical means of auto-correlation will average out such stochastic differences rending a virtually perfect alignment of the two recordings such that an advantageous splice point may be found for joining the two segments as shown at 2104 of FIG. 21.

The resulting file is then stored in data storage 1509 and can also be played back in near real time via digital-to-analog converter 1510 or sent over a local area network 1511 to another system. For the purposes of immediate playback, the system of the invention can begin playing back the recorded audio from the first tonearm of the outer-most sector. The second and, if present, additional tonearms also record simultaneously. The second and possible additional sectors will provide enough recorded information to allow the system to detect the start point of each recording and prepare to byte-accurately splice said start point of the second recorded section to the end of the recorded first section. By the end of the first recording section, the remaining section(s) will have also completed or nearly completed. In the presence of more than two sections, all sections will have typically concluded recording before the second section completes playback. Hence, all subsequent recorded sections, if present, are simply digitally spliced to the end of the respective previous section to form a complete recording of the selected side of the record.

An improvement to the apparatus of the invention would be the addition of a robotic arm to place the record on the turntable from a record storage shelf means. The robotic arm could also be employed to flip the record to its opposite side for the recording of said side and then replace said record back on the record storage shelf and another record would be selected and placed on the turntable analogous to the jukebox mechanisms popular from the 1940's to the 1960's.

A further improvement of the invention is the process of rotating the turntable platter at one-half speed to playback the phonograph record at half the frequency of the original recording. By means of example, a piano note played on the major scale of middle A of 440 hertz would sound one octave lower at A 220 Hertz. The advantage of this half=speed playback would be to obtain a more accurate transcription of the phonograph record as the playback stylus is moving at one-half the linear velocity of normal playback and hence tracing the mechanical undulations of the recorded surface with additional accuracy. This additional accuracy results from less unwanted ringing of the cantilever to which the playback stylus is attached as well as to greater accuracy of the playback stylus following the impressions on the groove wall of the audio information. The system of the invention would apply an addition processing step of frequency doubling by means of digital up-conversion to restore the audio signal to its original frequency range as would be heard at normal playback speeds. The result of the process using the previous example would be the piano note of the example sounding at A 220 hertz would then post processing then sound at note A 440 hertz as intended by the recording. Frequency doubling may also be referred to as up-conversion.

The method and apparatus of the invention as described herein thereby enables the recording of a perceptually seamless high-definition digital audio facsimile with an average tracking distortion that is both relatively mathematically even and quantifiably well below known human perception thus enabling a previously unattainable quality of digital recordings of phonograph records for many uses such as re-mastering new vinyl LP records or for the sale of digital copies of said media.

FIG. 28 illustrates a system and/or an operational flow 2800 representing example circuitry, means and/or operations related to playback of phonograph records. In FIG. 28 and in following figures that include various examples of circuitry, means and/or operational flows, discussion and explanation may be provided with respect to the above-described examples of FIGS. 1 through 27, and/or with respect to other examples and contexts. However, it should be understood that the circuitry, means and/or operational flows may be executed in a number of other environments and contexts, and/or in modified versions of FIGS. 1 through 27. Also, although the various circuitry, means and/or operational flows are presented in the sequence(s) illustrated, it should be understood that the various procedures carried out by circuitry or means and/or the operational flows may be performed in other orders than those which are illustrated, or may be performed concurrently. "Operational flow" as used herein may include circuitry for carrying out the flow; hence, FIGS. 1 through 27 reference "circuitry configured for" performing a procedure. A processing device, such as a microprocessor, may, via execution of one or more instructions or other code-like appurtenances, become "circuitry configured for" a particular operation. An operational flow as carried out by a processing device would render the processing device "circuitry configured for" carrying out each operation via execution of the one or more instructions or other appurtenances.

After a start operation, the operational flow 2800 moves to operation 2810. Operation 2810 depicts circuitry configured for obtaining a first audio segment associated with a first recording area of a phonograph record. For example, as shown in and/or described with respect to FIGS. 1 through 27, an audio segment may be obtained via a tonearm, the tonearm having been placed at a particular point on the phonograph record perhaps by the optical monitoring device in conjunction with the mechanical tonearm lifting component discussed in relation to FIG. 19. In certain embodiments, the tonearm is configured for a particular geometry and optimized for reduced distortion during playback of a particular recording area of the phonograph record.

Then, operation 2820 depicts circuitry configured for obtaining at least a second audio segment associated with at least a second recording area of the phonograph record, the second recording area at least partially overlapping with the first recording area. For example, as shown in and/or described with respect to FIGS. 1 through 27, at least a second audio segment is obtained via at least a second tonearm. As discussed relative to FIG. 27, "at least a second audio segment" could include a second, third, fourth, or any number of audio segments obtained via any number of tonearms, up to a practical size limit of tonearms that could be fitted to the apparatus. At least a portion of the first recording area overlaps with at least a portion of the second recording area. In some embodiments, at least a portion of the second recording area overlaps with at least a portion of the third recording area. One result is that, for example, the first audio segment will have a portion near its beginning or end which correlates with a portion of the second audio segment near its beginning or end. A first portion may relate to an outermost recording area or an innermost recording area. If a first portion relates to an outermost recording area and the second portion is an inner recording area, then a portion towards the end of the first audio segment will correlate with a portion of the beginning of the second audio segment. An outer recording area may run from an outer groove radius of 150 to an inner groove radius of 90; an inner recording area may run from an outer groove radius of 110 to an inner groove radius of 56. Thus, the second recording area (the inner recording area in this example) overlaps the first recording area in that they both span from 90 to 110 units. Sound played back in this 90 to 110 unit zone may be correlated in the first and second audio segments using operations disclosed elsewhere herein.

Then, operation 2830 depicts circuitry configured for stitching the first and the at least a second audio segment. For example, as shown in and/or described with respect to FIGS. 1 through 27, the first and second audio segments are aligned (the aligned portion relating to the overlap—the 90 to 110 unit zone in the example of the previous paragraph). A point within the overlap is selected. A continuous stream is assembled by concatenating the first segment up to the selected point with the second segment from the selected point on. In a three audio segment embodiment, the process is repeated whereby a point is selected in the overlap between the second and third audio segments, and the second segment up to the selected point is concatenated with the third segment from that selected point. The operational flow then proceeds to an end operation.

The point selected for stitching and/or concatenating audio segments may be any point along the aligned audio sections correlating with the overlapping recording areas. Using operations and/or other subject matter disclosed herein, a splice point is selected to minimize audible detection of the transition between audio segments by a listener. In some embodiments, the point may be where waveform representations of the audio segments match. A "zero point" where minimum transience is sought, in which amplitudes of the wave representations of the audio segments cross over at zero. In some embodiments, a splice point may also or alternatively be where the distortion is equal in both audio segments.

Notably, the segments are not required to be obtained by separate tonearms. In some embodiments in which the benefit of reduced distortion is desired but multiple tonearms are not present (e.g. embodiments like those discussed with respect to FIG. 15b), a single tonearm version of the device with adjustable angle, overhang and other tonearm aspects could be implemented in which the first operation 2810 would set calibrations of the single tonearm for the first recording area and the first audio segment would be obtained, then the second operation 2820 would set calibrations for the second recording area (perhaps first lifting the tonearm) and the second audio segment would be obtained (the first and second segments at least partially overlapping), and the first and second segments would be stitched. Such a single-tonearm embodiment might be a pivoting tonearm or a linear tonearm system. One possible downside is the new distortion which could be introduced by mechanisms for adjusting the single tonearm cartridge. (Such downsides may be minimized through use of a linear system or other means.) Further, multiple tonearms have the benefit of drawing in a side of a phonograph record more quickly than a single tonearm embodiment, but a single tonearm system with adjustable cartridge would function via making the tonearm calibration adjustment during the playback. In either of a single- or multiple-tonearm version, stitching the segments provides the benefit of reduced distortion.

Figure 29:
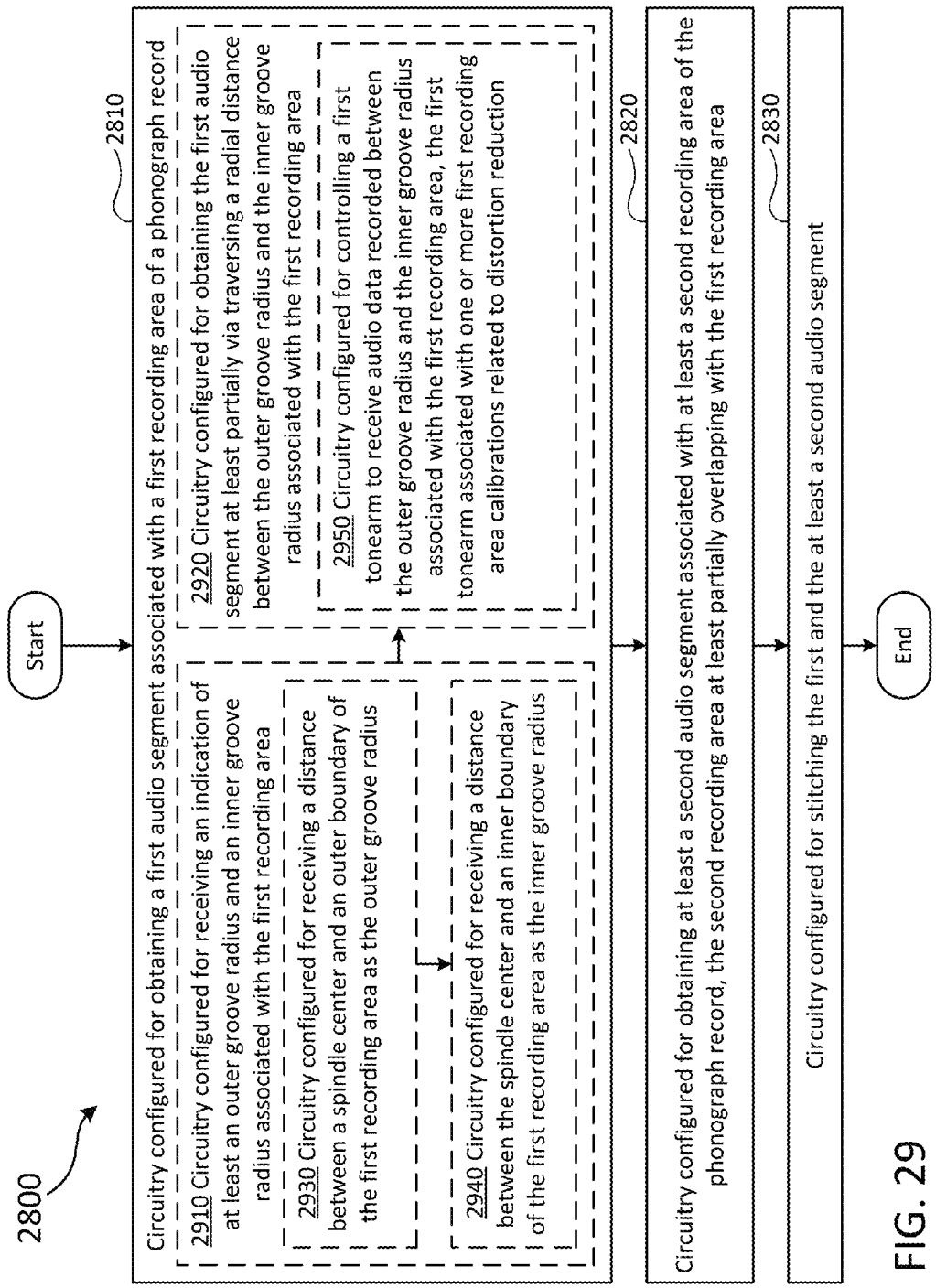

FIG. 29 illustrates alternative embodiments of the example operational flow 2800 of FIG. 28. FIG. 29 illustrates an example embodiment where operational flow 2810 may include at least one additional operation. Additional operations may include operation 2910, 2920, 2930, 2940, and/or 2950.

Operation 2910 illustrates circuitry configured for receiving an indication of at least an outer groove radius and an inner groove radius associated with the first recording area. For example, as shown in and/or described with respect to FIGS. 1 through 27, a control system may read parameters which define a first recording area as an outermost recording area of a phonograph record. The parameters would define an outer and inner radius from a spindle, between which is defined a thickness of a concentric portion of the phonograph record.

Then, operation 2920 illustrates circuitry configured for obtaining the first audio segment at least partially via traversing a radial distance between the outer groove radius and the inner groove radius associated with the first recording area. For example, as shown in and/or described with respect to FIGS. 1 through 27, a tonearm may be moved to the outer groove radius of the first recording area and placed onto the phonograph record. The turntable may be spun at an appropriate RPM (revolutions per minute) for the type of phonograph record, and the tonearm would read data contained in the grooves within the concentric band. The first audio segment may be stored as it is read in a non-transitory data medium of the system for later splicing with the second audio segment, perhaps after being amplified via the two-channel amplifier and converted to digital data by an analog-to-digital converter as disclosed with respect to FIG. 15. In some embodiments, data read by the tonearm is monophonic, stereophonic, quadraphonic, or another type of data.

Operation 2910 may include at least one additional operation. Additional operations may include operation 2930 and/or 2940.

Operation 2930 illustrates circuitry configured for receiving a distance between a spindle center and an outer boundary of the first recording area as the outer groove radius. For example, as shown in and/or described with respect to FIGS. 1 through 27, a control system may read parameters which define a first recording area. In some embodiments, the parameters could include an outer groove radius representing a distance from the center of a spindle, which may be, for example 150 units.

Operation 2940 illustrates circuitry configured for receiving a distance between the spindle center and an inner boundary of the first recording area as the inner groove radius. In some embodiments, as shown in and/or described with respect to FIGS. 1 through 27, when the control system reads the parameters defining the first recording area, the parameters could include an inner groove radius representing a distance from the center of the spindle, which may be, for example, 90 units. The first recording area would thus be a concentric ring having a thickness of 60 units.

Operation 2920 may include at least one additional operation. Additional operations may include operation 2950.

Operation 2950 illustrates circuitry configured for controlling a first tonearm to receive audio data recorded between the outer groove radius and the inner groove radius associated with the first recording area, the first tonearm associated with one or more first recording area calibrations related to distortion reduction. In some embodiments, as shown in and/or described with respect to FIGS. 1 through 27, the first tonearm may be associated with calibration values designed to minimize distortion within the first recording area. As discussed elsewhere herein, by configuring a tonearm to read only a portion of the total recording area of a phonograph record, distortion may be reduced in some instances by an order of magnitude. Using calibration values calculated for a tonearm arc covering only that particular concentric band is discussed, for example, in FIGS. 10 and 11. In different embodiments, the tonearms are not calibrated for a particular band; the multiple tonearms are used to obtain an audio stream of the side of the phonograph record more quickly than the single tonearm player as digital signal processing is used to stitch together audio segments obtained by the multiple tonearms using operations disclosed herein such as aligning the multiple audio segments, finding a point and concatenating about that point.

Figure 30:
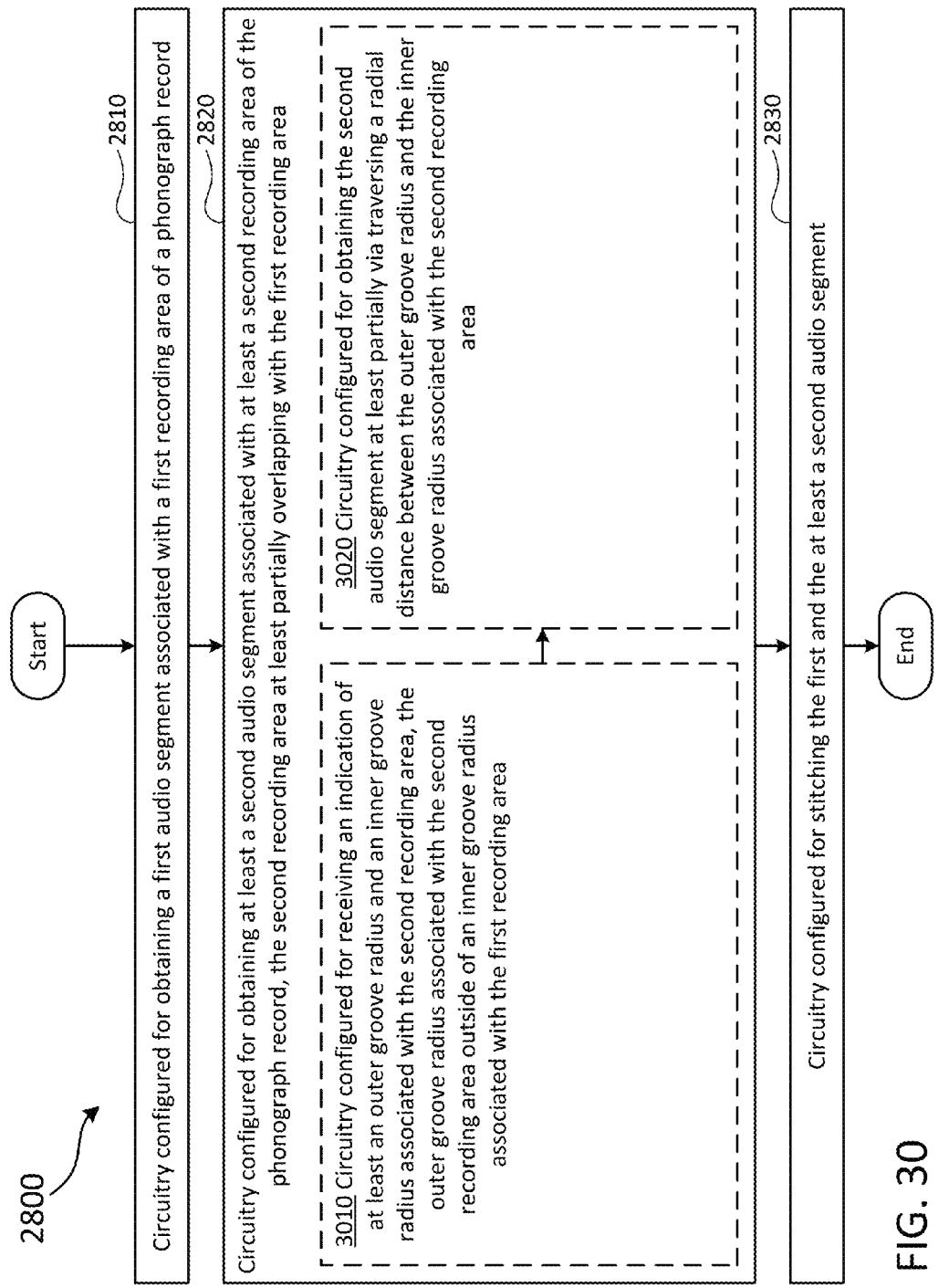

FIG. 30 illustrates alternative embodiments of the example operational flow 2800 of FIG. 28. FIG. 30 illustrates an example embodiment where operational flow 2820 may include at least one additional operation. Additional operations may include operation 3010, and/or 3020.

Operation 3010 illustrates circuitry configured for receiving an indication of at least an outer groove radius and an inner groove radius associated with the second recording area, the outer groove radius associated with the second recording area outside of an inner groove radius associated with the first recording area. For example, as shown in and/or described with respect to FIGS. 1 through 27, a control system may read parameters which define a second recording area as an innermost recording area of a phonograph record (or at least a recording area which is a concentric band positioned closer to the spindle than the first recording area, as disclosed elsewhere herein are embodiments in which the phonograph record is mapped into three recording areas). The parameters would define an outer and inner radius from a spindle, between which is defined a thickness of a concentric portion of the phonograph record for the second recording area. In some embodiments, an outer radius from the spindle of the second recording area is greater than the inner radius from the spindle of the first recording area, the difference between the two correlating with the overlap between the first and second recording areas.

Then, operation 3020 illustrates circuitry configured for obtaining the second audio segment at least partially via traversing a radial distance between the outer groove radius and the inner groove radius associated with the second recording area. For example, as shown in and/or described with respect to FIGS. 1 through 27, a tonearm may be moved to the outer groove radius of the second recording area and placed onto the phonograph record. The turntable may be spun at an appropriate RPM (revolutions per minute) for the type of phonograph record, and the tonearm would read data contained in the grooves within the concentric band defining the second recording area. The second audio segment may be stored as it is read in a non-transitory data medium of the system for later splicing with the first audio segment, perhaps after being amplified via the two-channel amplifier and converted to digital data by an analog-to-digital converter as disclosed with respect to FIG. 15. In some embodiments, data read by the tonearm is monophonic, stereophonic, quadraphonic, or another type of data.

Figure 31:
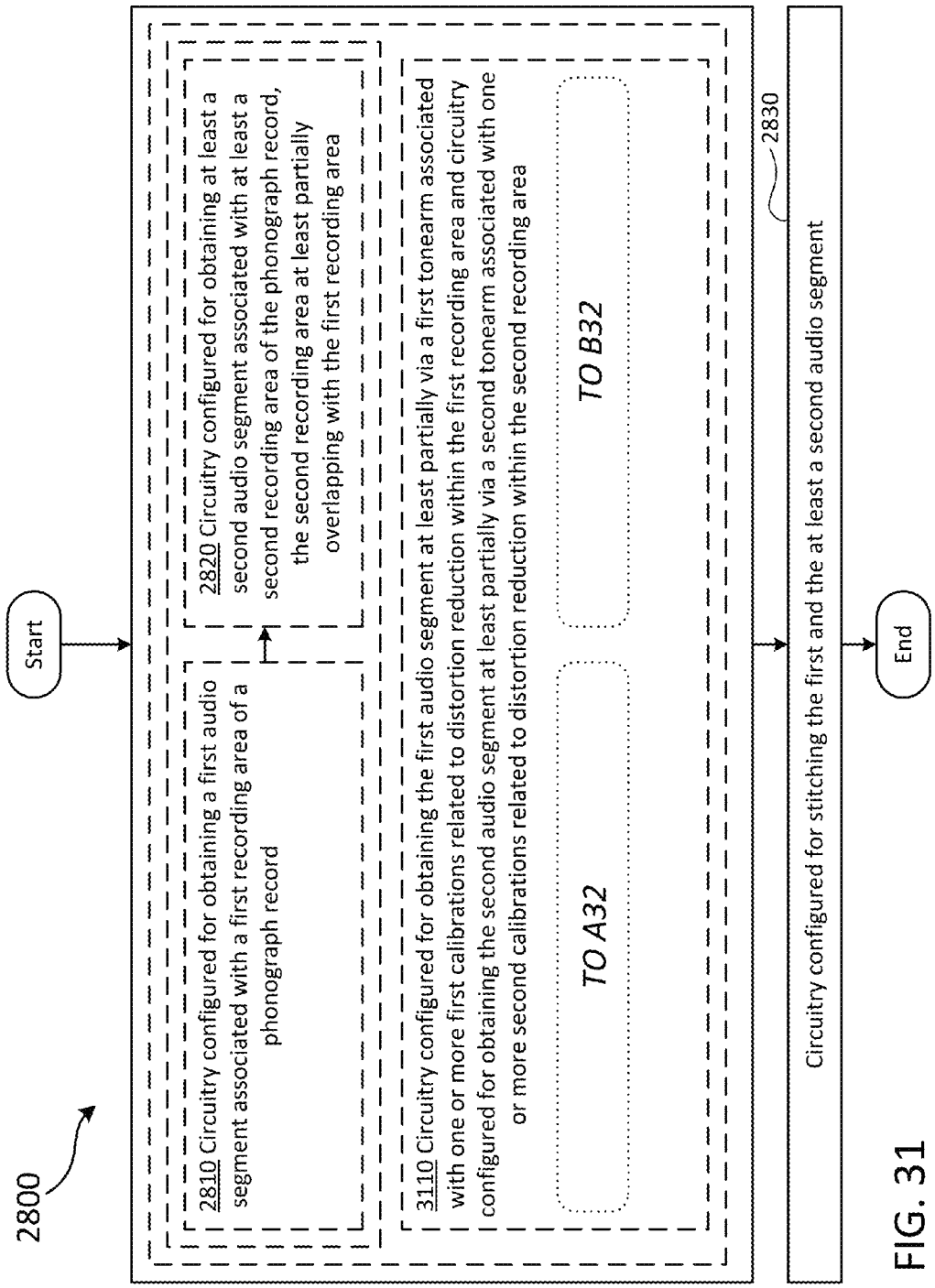

FIG. 31 illustrates alternative embodiments of the example operational flow 2800 of FIG. 28. FIG. 31 illustrates an example embodiment where the combined operational flows 2810 and 2820 may include one or more alternative operations 3110.

Operation 3110 illustrates circuitry configured for obtaining the first audio segment at least partially via a first tonearm associated with one or more first calibrations related to distortion reduction within the first recording area and circuitry configured for obtaining the second audio segment at least partially via a second tonearm associated with one or more second calibrations related to distortion reduction within the second recording area. For example, as shown in and/or described with respect to FIGS. 1 through 27, a first tonearm may be calibrated for distortion reduction specific to a first recording area and/or an arc traveled by the first tonearm while reading from within the first recording area, while a second tonearm may be calibrated for distortion reduction specific to a second recording area and/or an arc traveled by the second tonearm while reading from within the second recording area. Utilizing two tonearms facilitates obtaining an audio representation of the side of the phonographic record quicker than a single tonearm embodiment, and as discussed elsewhere herein, by digitally combining audio segments obtained by the tonearms which are individually reduced in distortion by virtue of the calibrations of the tonearms, the combined audio representation is also reduced in distortion relative to a single tonearm embodiment where the single tonearm reads the entire recording area of the side of the phonograph record.

Figure 32:
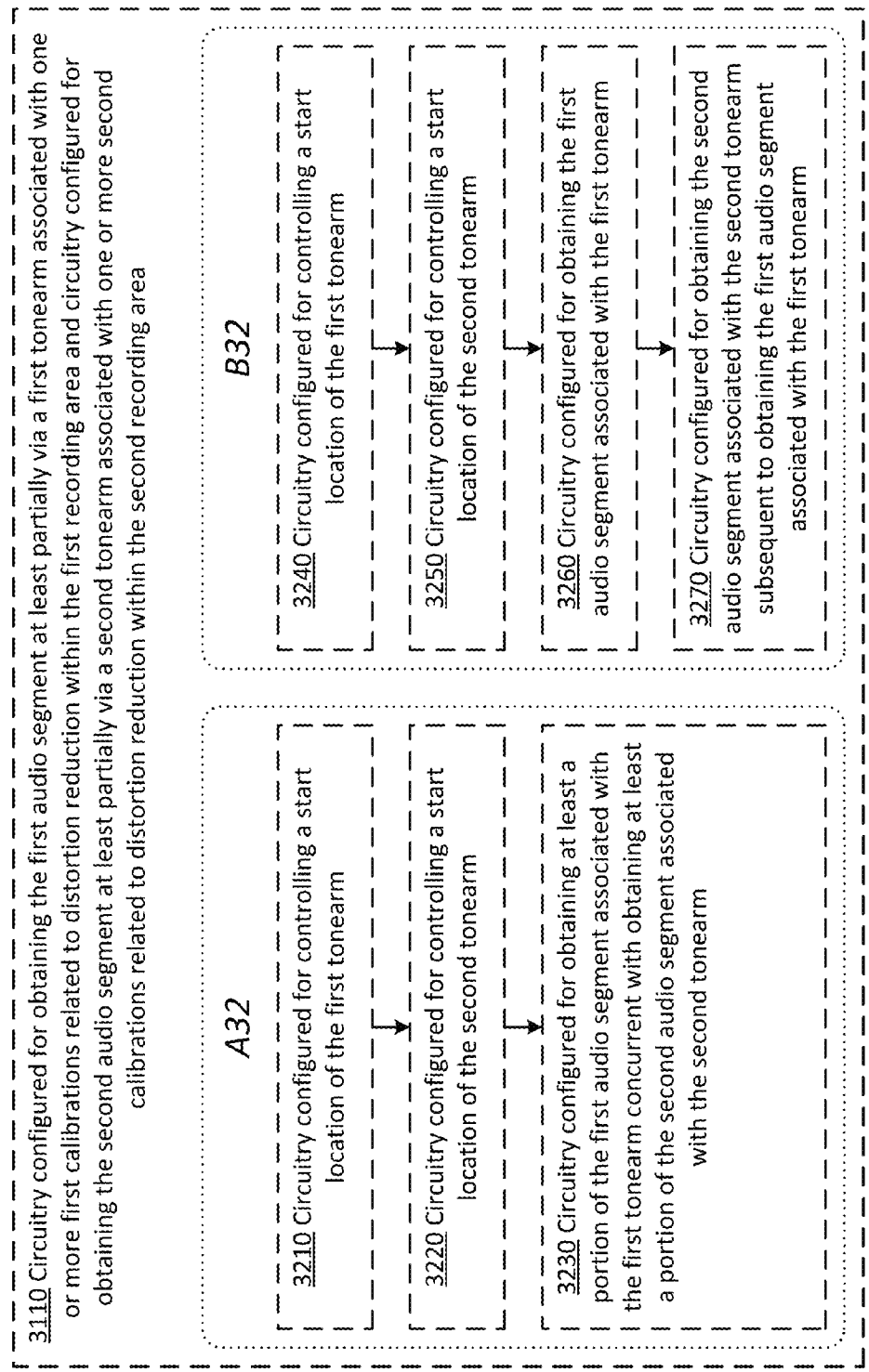

FIG. 32 illustrates alternative embodiments of the example operational flow 3110 of FIG. 31. FIG. 32 illustrates an example embodiment where operational flow 3110 may include at least one additional operation. Additional operations may include operation A32: 3210, 3220, and/or 3230, and/or B32: 3240, 3250, 3260, and/or 3270.

Operation 3210 illustrates circuitry configured for controlling a start location of the first tonearm. For example, as shown in and/or described with respect to FIGS. 1 through 27, a control system may operate a means for lifting the first tonearm and moving the first tonearm to a start location, which may be a received outer groove radius corresponding to the first recording area. The first tonearm (also the second and any additional tonearms) may be a free-swiveling tonearm, with no mechanical sensors or mechanical drive means permanently coupled to the swivel or tonearm means. Mechanical sensors or mechanical drive means could, if present, introduce additional sources of distortion.

Then, operation 3220 illustrates circuitry configured for controlling a start location of the second tonearm. For example, as shown in and/or described with respect to FIGS. 1 through 27, a control system may operate a means for lifting the second tonearm and moving the second tonearm to a start location, which may be a received outer groove radius corresponding to the second recording area. The second tonearm (also the first and any additional tonearms) may be lifted by a mechanical lifter component, which lifts the tonearm using a vertical drive apparatus and moves the tonearm laterally using a horizontal drive apparatus. Utilizing the lifter provides the benefit of not requiring permanent attachment of mechanical sensors or drive means to the tonearm which could introduce distortion, but also enables the tonearm positioning to be automatic. The lifter means may also be used when the tonearm reaches the end of a recording area to return the tonearm to an initial position and/or to move the tonearm to any position over the phonograph record.

Then, operation 3230 illustrates circuitry configured for obtaining at least a portion of the first audio segment associated with the first tonearm concurrent with obtaining at least a portion of the second audio segment associated with the second tonearm. For example, as shown in and/or described with respect to FIGS. 1 through 27, a control system may initiate the rotation of the turntable supporting the phonograph record, either prior to, concurrent with, or subsequent to the tonearms being positioned at the start location. As the tonearms traverse the recording area along their respective grooves, the audio data embedded in the recording areas is read by the tonearms. Audio segments are produced (which may involve amplification and analog-to-digital conversion operations and/or circuitry) and provided to a non-transitory data store.

Operation 3240 illustrates circuitry configured for controlling a start location of the first tonearm. For example, as shown in and/or described with respect to FIGS. 1 through 27, a control system may use an optical image sensor to obtain a location of the first tonearm (also the second or any additional tonearms). A portion of the first tonearm may be provided with a particular visual cue for ease of optical image recognition by the control system. Recognizing that phonograph records are predominantly black in color and so are many tonearm cartridges, a top surface may be provided with a white index line to aid an optical recognition component in converting a visual picture of the tonearm's location to a value which can be used by the control system to determine movement required for positioning the tonearm at the start location.

Then, operation 3250 illustrates circuitry configured for controlling a start location of the second tonearm. For example, as shown in and/or described with respect to FIGS. 1 through 27, a control system may use the optical image sensor, which can be a camera coupled with the control system in a wired or wireless fashion, to provide a location of the second tonearm (also the first or any additional tonearms). The optical image sensor may be a video camera and/or be a camera configured for detecting infrared, ultraviolet or other frequencies which may be visible or invisible to the human eye. Data from the optical image sensor may be used to assist in movement of the second tonearm to the start location. A rotation speed for the turntable could be determined partially using data from the optical image sensor detecting a size of the phonograph record (e.g. if data from the sensor indicates that a 7" phonograph record is on the turntable, a speed of 45 rpm could be selected).

Then, operation 3260 illustrates circuitry configured for obtaining the first audio segment associated with the first tonearm. For example, as shown in and/or described with respect to FIGS. 1 through 27, a control system may initiate the rotation of the turntable supporting the phonograph record, either prior to, concurrent with, or subsequent to the first tonearm being positioned at the start location. The first tonearm may obtain the first audio segment at a time other than a time at which the second tonearm obtains the second audio segment.

Then, operation 3270 illustrates circuitry configured for obtaining the second audio segment associated with the second tonearm subsequent to obtaining the first audio segment associated with the first tonearm. For example, as shown in and/or described with respect to FIGS. 1 through 27, the first and second tonearms may, in some embodiments, obtain a first and second audio segment sequentially. In other words, the second tonearm may be inactive or may be in motion responsive to the control system but not in contact with the record while the first tonearm obtains its audio segment corresponding to the first recording area, and the first tonearm may be inactive or may be in motion responsive to the control system but not in contact with the record while the second tonearm obtains its audio segment corresponding to the second recording area. As the tonearms traverse the recording area along their respective grooves, the audio data embedded in the recording areas is read by the tonearms. Audio segments are produced (which may involve amplification and analog-to-digital conversion operations and/or circuitry) and provided to a non-transitory data store.

Figure 33:
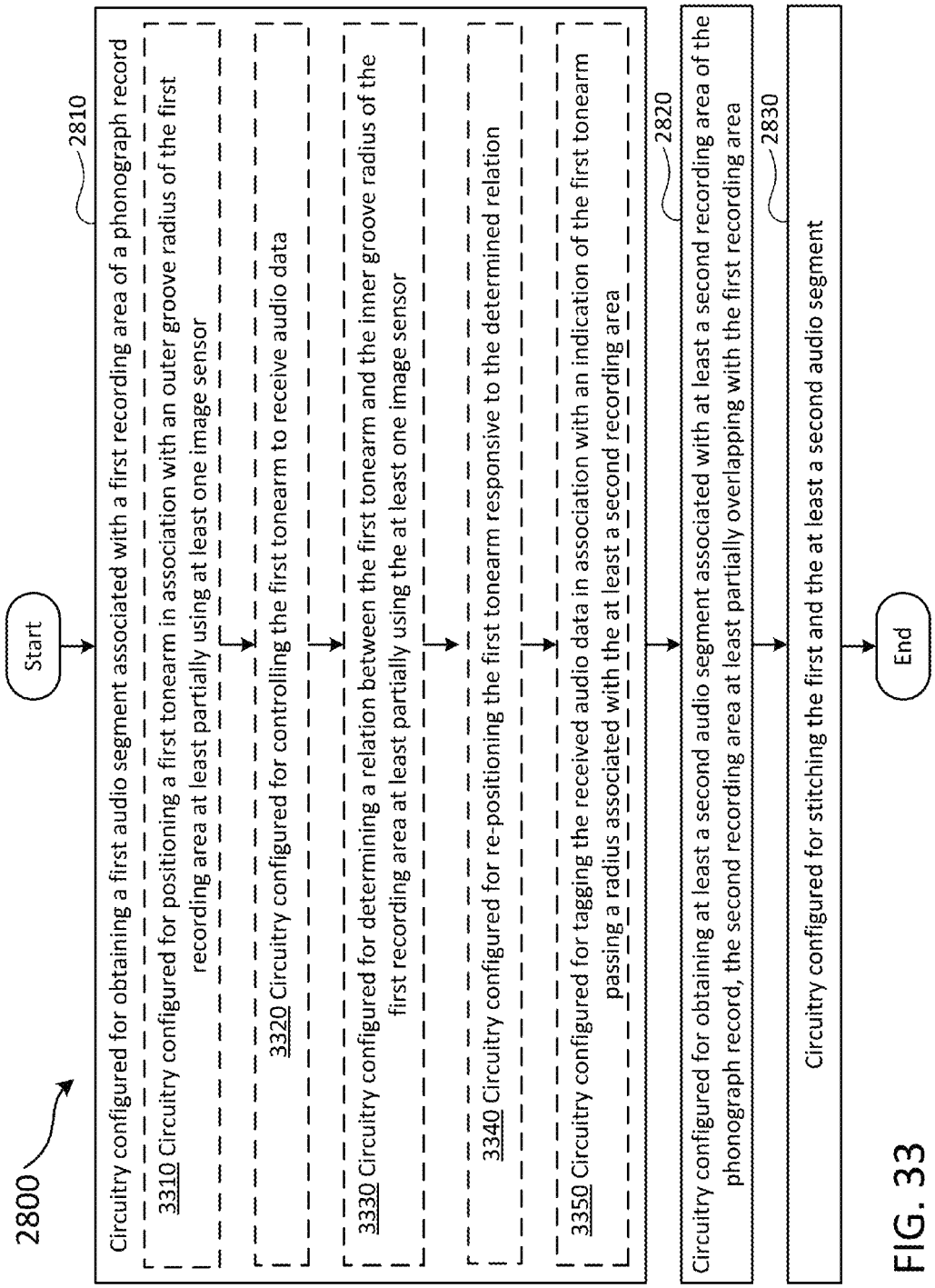

FIG. 33 illustrates alternative embodiments of the example operational flow 2800 of FIG. 28. FIG. 33 illustrates an example embodiment where operational flow 2810 may include at least one additional operation. Additional operations may include operation 3310, 3320, 3330, 3340, and/or 3350.

Operation 3310 illustrates circuitry configured for positioning a first tonearm in association with an outer groove radius of the first recording area at least partially using at least one image sensor. For example, as shown in and/or described with respect to FIGS. 1 through 27, upon receiving parameters which define a first recording area as an outermost recording area of a phonograph record, the control system may receive data from the optical sensor/video camera/image sensor which can be used to determine a current position for the tonearm and a movement needed to position the tonearm along the outer groove radius of the first recording area (the lead-in groove, for example). The control system may then command a mechanical lifter to position the tonearm accordingly.

Then, operation 3320 illustrates circuitry configured for controlling the first tonearm to receive audio data. For example, as shown in and/or described with respect to FIGS. 1 through 27, the rotation of the turntable causes the groove of the phonograph record to pass underneath the tonearm. Audio data is picked up by the tonearm, processed and stored.

Then, operation 3330 illustrates circuitry configured for determining a relation between the first tonearm and the inner groove radius of the first recording area at least partially using the at least one image sensor. For example, as shown in and/or described with respect to FIGS. 1 through 27, the optical sensor may determine that the tonearm has arrived at an inner groove radius using optical recognition operations disclosed elsewhere herein.

Then, operation 3340 illustrates circuitry configured for re-positioning the first tonearm responsive to the determined relation. For example, as shown in and/or described with respect to FIGS. 1 through 27, upon recognition using data from the optical sensor that the tonearm is at or is near the inner groove radius defining the end of the first recording area, a control system may command a mechanical lifter to move laterally and vertically to capture the tonearm and reposition it. The lifting component may lift the tonearm from underneath. Alternatively, the lifting component may incorporate a claw which descends from overhead and grasps the tonearm to lift it away from the phonograph record. In different embodiments, the claw may also be used to permit the tonearm to descend, coming into contact with the phonograph record or with a neutral position stand.

Optional operation 3350 illustrates circuitry configured for tagging the received audio data in association with an indication of the first tonearm passing a radius associated with the at least a second recording area. For example, as shown in and/or described with respect to FIGS. 1 through 27, upon the tonearm reaching or nearly reaching the start of the second recording area, having traversed the spiral groove from a position at or near the outer groove radius, a tag associated with a time is set. In some embodiments, a time at which the tonearm was placed at or near the outer groove radius of the first recording area is set as a tag as well. The tags are associated (stored in memory, for example) with the audio recordings. The times at which the tonearm passes certain groove radii are useful in aligning the first audio segment with the second audio segment, the second audio segment having also been duly tagged. For example, assume the beginning of the second recording area is at 110 units, and the end of the first recording area is at 90 units. The 110 unit mark therefore defines the outer radius of the overlapping portion of the first and second recording areas. Assume further that the first and second tonearms begin recording at t=0, and that the first tonearm passes 110 units at time t=100. An initial alignment of the two audio segments may be determined by aligning the start of the second audio segment at the t=100 mark relative to the first audio segment. The initial alignment may be directly used to splice the segments together, or the initial alignment may be a starting point for finding a more desirable splice point (for example, at a portion in the two segments where distortion is equal, or at another point at which detection of the transition would be undetectable to a human listener).

Figure 34:
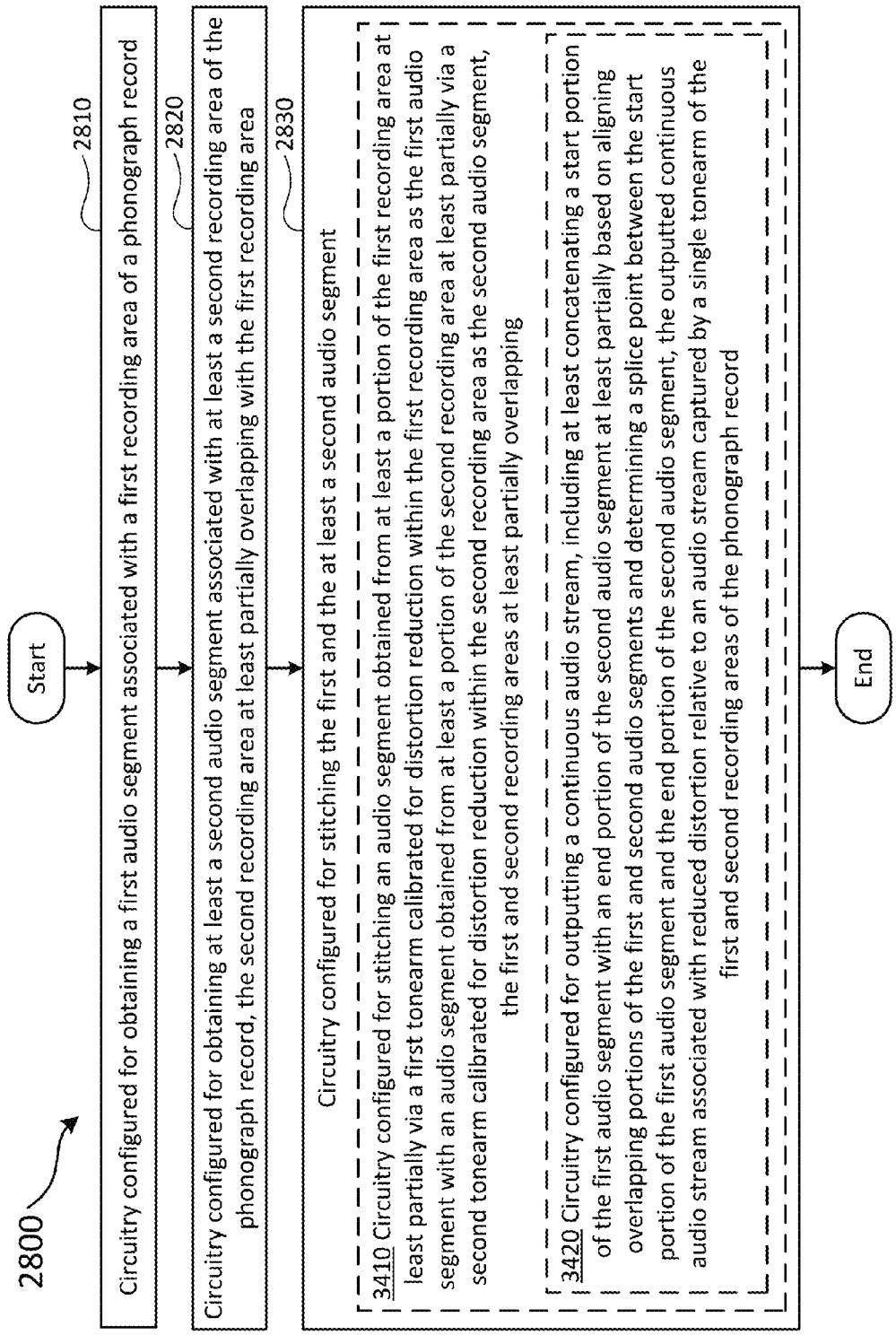

FIG. 34 illustrates alternative embodiments of the example operational flow 2800 of FIG. 28. FIG. 34 illustrates an example embodiment where operational flow 2830 may include at least one additional operation. Additional operations may include operation 3410 and/or 3420.

Operation 3410 illustrates circuitry configured for stitching an audio segment obtained from at least a portion of the first recording area at least partially via a first tonearm calibrated for distortion reduction within the first recording area as the first audio segment with an audio segment obtained from at least a portion of the second recording area at least partially via a second tonearm calibrated for distortion reduction within the second recording area as the second audio segment, the first and second recording areas at least partially overlapping. For example, as shown in and/or described with respect to FIGS. 1 through 27, a continuous audio stream representing the audio recording present on the side of the phonograph record may be produced at least partially based on the first audio segment and the second audio segment, the first and second audio segment corresponding with first and second recording areas of the phonograph record and first and second tonearms having been calibrated to reduce distortion within the first and second recording areas. Upon splicing, stitching and/or concatenating portions of the first audio segment and second audio segment at an appropriate splice point, the resulting continuous audio stream features distortion levels similar to those of the individual audio segments, which may be an order of magnitude less than an audio stream captured by a single tonearm which is calibrated for the entire side of the phonograph record. For example, as shown in and/or described with respect to FIGS. 1 through 27, a continuous audio stream representing the audio recording present on the side of the phonograph record may be produced at least partially based on concatenation, splicing and/or stitching portions of the first audio segment and the second audio segment.

Optional operation 3420 illustrates circuitry configured for outputting a continuous audio stream, including at least concatenating a start portion of the first audio segment with an end portion of the second audio segment at least partially based on aligning overlapping portions of the first and second audio segments and determining a splice point between the start portion of the first audio segment and the end portion of the second audio segment, the outputted continuous audio stream associated with reduced distortion relative to an audio stream captured by a single tonearm of the first and second recording areas of the phonograph record. For example, as shown in and/or described with respect to FIGS. 1 through 27, a continuous audio stream representing the audio recording present on the side of the phonograph record may be produced at least partially based on the first audio segment and the second audio segment, the first and second audio segment corresponding with first and second recording areas of the phonograph record and first and second tonearms having been calibrated to reduce distortion within the first and second recording areas. Upon splicing, stitching and/or concatenating portions of the first audio segment and second audio segment at an appropriate splice point, the resulting continuous audio stream features distortion levels similar to those of the individual audio segments, which may be an order of magnitude less than an audio stream captured by a single tonearm which is calibrated for the entire side of the phonograph record.

Figure 35:
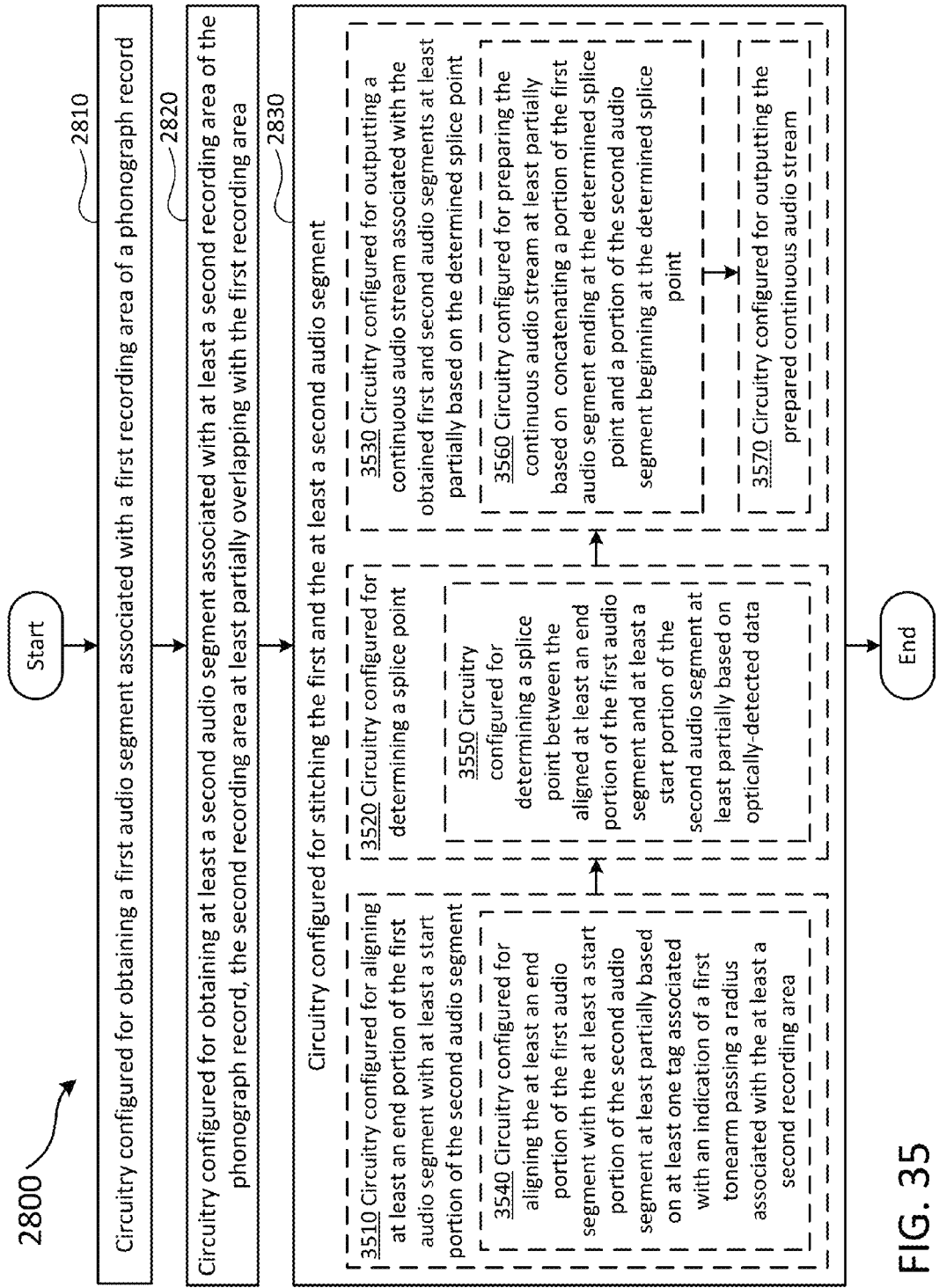

FIG. 35 illustrates alternative embodiments of the example operational flow 2800 of FIG. 28. FIG. 35 illustrates an example embodiment where operational flow 2830 may include at least one additional operation. Additional operations may include operation 3510, 3520, 3530, 3540, 3550, 3560, and/or 3570.

Operation 3510 illustrates circuitry configured for aligning at least an end portion of the first audio segment with at least a start portion of the second audio segment. For example, as shown in and/or described with respect to FIGS. 1 through 27, timelines associated with the first and second audio segments may be aligned such that the overlap between the timelines, detected at least partially using the optical sensor, represents the same or substantially the same audio data (allowing for minor and mostly human-inaudible differences in the first and second audio recordings due to the different calibrations of the tonearms or other factors). In most cases the alignment will result in an ending portion of the first audio segment (which may be from groove radius 110 to groove radius 90) overlapping with a beginning portion of the second audio segment (which also may be from groove radius 110 to groove radius 90).

Then, operation 3520 illustrates circuitry configured for determining a splice point. For example, as shown in and/or described with respect to FIGS. 1 through 27, a desirable splice point is one at which a transition from the first audio segment to the second audio segment is undetectable to the human ear.

Then, operation 3530 illustrates circuitry configured for outputting a continuous audio stream associated with the obtained first and second audio segments at least partially based on the determined splice point. For example, as shown in and/or described with respect to FIGS. 1 through 27, a continuous audio stream may include the non-overlapping beginning portion of the first audio segment, the overlapping portion of the first audio segment up to the splice point, the overlapping portion of the second audio segment beginning at the splice point, and the non-overlapping ending portion of the second audio segment.

Operation 3510 includes optional operation 3540. Operation 3540 illustrates circuitry configured for aligning the at least an end portion of the first audio segment with the at least a start portion of the second audio segment at least partially based on at least one tag associated with an indication of a first tonearm passing a radius associated with the at least a second recording area. For example, as shown in and/or described with respect to FIGS. 1 through 27, an initial point along timelines corresponding to the beginning of overlap in the first audio segment and second audio segment may be determined using a stored tag which encodes a time at which the first tonearm entered the area of overlap. The entire timelines of both segments may then be aligned with respect to the initial point. Alternatively, the initial point may correspond to the ending of overlap in the first audio segment and second audio segment, determined using a stored tag which encodes a time at which the second tonearm left the area of overlap.

Operation 3520 includes optional operation 3550. Operation 3550 illustrates circuitry configured for determining a splice point between the aligned at least an end portion of the first audio segment and at least a start portion of the second audio segment at least partially based on optically-detected data. For example, as shown in and/or described with respect to FIGS. 1 through 27, a splice point may be a midway point between the beginning of the overlap of the two audio segments and the ending of the overlap of the two audio segments. Such a splice point may or may not optimize the transition in that it may or may not result in a human-inaudible transition from the first audio segment to the second audio segment within the continuous audio stream. Alternatives to the midway point for a splice point may be determined as described elsewhere herein (for example, finding a point within the two segments where distortion is equal, finding a point within the two segments where amplitude of waveforms representing the segments are equal, finding a point where waveforms cross at zero, finding a point resulting in minimum transience, etc.). The splice point may be based on optically-detected data (such as a splice point correlated with time-associated tags relating to when a first tonearm and second tonearm crossed a specific point in the overlap area—the time t=100 mark relative to the first audio segment, for example. A point of interest at which time is marked when the first and second tonearms pass as detected optically may be determined prior to calibrating the tonearms based on calculations related to optimizing the first and second recording areas. This may represent the splice point, or the splice point may be moved forward or back to optimize distortion reduction as discussed previously.

Operation 3530 includes optional operations 3560 and/or 3570. Operation 3560 illustrates circuitry configured for preparing the continuous audio stream at least partially based on concatenating a portion of the first audio segment ending at the determined splice point and a portion of the second audio segment beginning at the determined splice point. For example, as shown in and/or described with respect to FIGS. 1 through 27, "excess" audio (audio which is present in the first audio segment past the splice point and audio which is present in the second audio segment previous to the splice point) is discarded and the remainder of the two segments is concatenated to form the continuous audio stream.

Then, operation 3570 illustrates circuitry configured for outputting the prepared continuous audio stream. For example, as shown in and/or described with respect to FIGS. 1 through 27, the continuous audio stream may be stored in one or more non-transitory computer-readable medium. The continuous audio stream may be played back over a speaker coupled with the apparatus (first passing through at least a digital to analog converter), transmitted in digital form via a wired or wireless network connection coupled with the apparatus, and/or stored in either digital or analog form in one or more removable or non-removable media coupled with the apparatus. Digital audio noise removal techniques may be applied either prior to stitching the portions of the audio segments forming the continuous audio stream or following the stitching.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real-time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, computers or computing means referred to in the specification may include a single processor or may employ multiple-processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language or operating systems. It is appreciated that a variety of programming languages and operating systems may be used to implement the teachings of the present invention as described herein.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

RELATED ART

Erik Lofgren—"On the Non-Linear Distortion in the Reproduction of Phonograph Records Caused by Angular Deviation of the Pickup Needle" published November, 1938
H. G. Baerwald "Analytic Treatment of Tracking Error and Notes on Optimal Pick-Up Design" Published May 1, 1941
B. B. Bauer "Tracking Angle" *Electronics* March 1945
Frank Schroder—U.S. Pat. No. 8,576,687 "COMPACT TANGENTIAL TRACKING TONEARM MECHANISM", field: 369/222, 369/255 issued November, 2013
F. Bruce Thigpen—"RADIAL PHONOGRAPH PICKUP ARM AND TURNTABLE COMBINATION USING AIR BEARINGS"—U.S. Pat. No. 4,628,500 field: 369/249, 255, 244, 245 issued May, 1985
Fumitaka Nagamura—"Tonearm Linear-Drive Apparatus"—U.S. Pat. No. 3,940,149, field: 274/23 issued February, 1974
Francis Dennesen—"Stylus Positioner"—U.S. Pat. No. 4,295,277—field 33/181 issued September, 1979
Wilhelmus Vivie—"Phonograph Tonearm Positioner" U.S. Pat. No. 2,601,987A—July, 1952

I claim:
1. A system, comprising:
a turntable configured for rotatably supporting a phonograph record;
a first tonearm calibrated with one or more distortion reduction values associated with a first recording area of the phonograph record;
circuitry configured for obtaining a first audio segment associated with the first recording area;
at least a second tonearm calibrated with one or more distortion reduction values associated with at least a second recording area of the phonograph record;
circuitry configured for obtaining at least a second audio segment associated with the at least a second recording area, the at least a second recording area at least partially overlapping with at least one of the first recording area or at least one other recording area;
at least one non-transitory computer-readable medium configured for storage of the first audio segment and the at least a second audio segment; and
circuitry configured for stitching the first audio segment and the at least a second audio segment, including at least outputting a continuous audio stream associated with reduced distortion relative to an audio stream captured by a single tonearm of the first and second recording areas of the phonograph record.
2. The system of claim 1, further comprising:
at least one image sensor disposed for obtaining at least one image of the first tonearm and the at least a second tonearm;
circuitry configured for providing at least some positional data related to the first and the at least a second tonearm at least partially via performing image recognition on one or more of the at least one image of the first tonearm and the at least a second tonearm obtained at least partially using the at least one image sensor; and
a tonearm positioning arrangement configured to position the first and the at least a second tonearm in association with obtaining the first audio segment and the at least a second audio segment at least partially based on the at least some positional data.
3. A system, comprising:
circuitry configured for obtaining a first audio segment associated with a first recording area of a phonograph record;
circuitry configured for obtaining at least a second audio segment associated with at least a second recording area of the phonograph record, the at least a second recording area at least partially overlapping with at least one of the first recording area or at least one other recording area; and
circuitry configured for stitching the first and the at least a second audio segment, including at least stitching an audio segment obtained from at least a portion of the first recording area at least partially via a first tonearm calibrated for distortion reduction within the first recording area as the first audio segment with at least a second audio segment obtained from at least a portion of the at least a second recording area at least partially via at least a second tonearm calibrated for distortion reduction within the at least a second recording area as the at least a second audio segment.
4. The system of claim 3, wherein circuitry configured for obtaining a first audio segment associated with a first recording area of a phonograph record comprises:
circuitry configured for receiving an indication of at least an outer groove radius and an inner groove radius associated with the first recording area; and circuitry configured for obtaining the first audio segment at least partially via traversing a radial distance between the outer groove radius and the inner groove radius associated with the first recording area.

5. The system of claim 4, wherein circuitry configured for receiving an indication of at least an outer groove radius and an inner groove radius associated with the first recording area comprises:
circuitry configured for receiving a distance between a spindle center and an outer boundary of the first recording area as the outer groove radius; and
circuitry configured for receiving a distance between the spindle center and an inner boundary of the first recording area as the inner groove radius.

6. The system of claim 4, wherein circuitry configured for obtaining the first audio segment at least partially via traversing a radial distance between the outer groove radius and the inner groove radius associated with the first recording area comprises:
circuitry configured for controlling a first tonearm to receive audio data recorded between the outer groove radius and the inner groove radius associated with the first recording area, the first tonearm associated with one or more first recording area calibrations related to distortion reduction.

7. The system of claim 3, wherein circuitry configured for obtaining at least a second audio segment associated with at least a second recording area of the phonograph record, the at least a second recording area at least partially overlapping with at least one of the first recording area or at least one other recording area comprises:
circuitry configured for receiving an indication of at least an outer groove radius and an inner groove radius associated with the at least a second recording area, the outer groove radius associated with the at least a second recording area outside of an inner groove radius associated with the first recording area; and
circuitry configured for obtaining the at least a second audio segment at least partially via traversing a radial distance between the outer groove radius and the inner groove radius associated with the at least a second recording area.

8. A system, comprising:
circuitry configured for obtaining a first audio segment associated with a first recording area of a phonograph record at least partially via a first tonearm associated with one or more first calibrations related to distortion reduction within the first recording area;
circuitry configured for obtaining at least a second audio segment associated with at least a second recording area of the phonograph record, the at least second recording area at least partially overlapping with at least one of the first recording area or at least one other recording area, at least partially via at least a second tonearm associated with one or more second calibrations related to distortion reduction within the at least a second recording area; and
circuitry configured for stitching the first audio segment and the at least a second audio segment.

9. The system of claim 8, wherein circuitry configured for obtaining a first audio segment associated with a first recording area of a phonograph record at least partially via a first tonearm associated with one or more first calibrations related to distortion reduction within the first recording area and circuitry configured for obtaining at least a second audio segment associated with at least a second recording area of the phonograph record, the at least a second recording area at least partially overlapping with at least one of the first recording area or at least one other recording area, at least partially via at least a second tonearm associated with one or more second calibrations related to distortion reduction within the at least a second recording area comprise:
circuitry configured for controlling a start location of the first tonearm;
circuitry configured for controlling a start location of the at least a second tonearm; and
circuitry configured for obtaining at least a portion of the first audio segment associated with the first tonearm concurrent with obtaining at least a portion of the at least a second audio segment associated with the at least a second tonearm.

10. The system of claim 8, wherein circuitry configured for obtaining a first audio segment associated with a first recording area of a phonograph record at least partially via a first tonearm associated with one or more first calibrations related to distortion reduction within the first recording area and circuitry configured for obtaining at least a second audio segment associated with at least a second recording area of the phonograph record, the at least a second recording area at least partially overlapping with at least one of the first recording area or at least one other recording area, at least partially via at least a second tonearm associated with one or more second calibrations related to distortion reduction within the at least a second recording area comprise:
circuitry configured for controlling a start location of the first tonearm;
circuitry configured for controlling a start location of the at least a second tonearm;
circuitry configured for obtaining the first audio segment associated with the first tonearm; and
circuitry configured for obtaining the at least a second audio segment associated with the at least a second tonearm subsequent to obtaining the first audio segment associated with the first tonearm.

11. The system of claim 3, wherein circuitry configured for stitching the first and the at least a second audio segment, including at least stitching an audio segment obtained from at least a portion of the first recording area at least partially via a first tonearm calibrated for distortion reduction within the first recording area as the first audio segment with at least a second audio segment obtained from at least a portion of the at least a second recording area at least partially via at least a second tonearm calibrated for distortion reduction within the at least a second recording area as the at least a second audio segment comprises:
circuitry configured for outputting a continuous audio stream, including at least concatenating a start portion of the first audio segment with an end portion of the second audio segment at least partially based on aligning overlapping portions of the first and second audio segments and determining a splice point between the start portion of the first audio segment and the end portion of the second audio segment, the outputted continuous audio stream associated with reduced distortion relative to an audio stream captured by a single tonearm of the first and second recording areas of the phonograph record.

12. The system of claim 8, wherein circuitry configured for stitching the first audio segment and the at least a second audio segment comprises:
circuitry configured for aligning at least an end portion of the first audio segment with at least a start portion of the second audio segment;
circuitry configured for determining a splice point; and circuitry configured for outputting a continuous audio stream associated with the obtained first and second audio segments at least partially based on the determined splice point.

13. The system of claim 12, wherein circuitry configured for outputting a continuous audio stream associated with the obtained first and second audio segments at least partially based on the determined splice point comprises:
    circuitry configured for preparing the continuous audio stream at least partially based on concatenating a portion of the first audio segment ending at the determined splice point and a portion of the second audio segment beginning at the determined splice point; and
    circuitry configured for outputting the prepared continuous audio stream.

14. The system of claim 8, further comprising:
    a turntable for rotatably supporting the phonograph record, the turntable including at least the first tonearm associated with the one or more first calibrations related to distortion reduction within the first recording area and the at least a second tonearm associated with one or more second calibrations related to distortion reduction within the at least a second recording area.

15. The system of claim 8, further comprising:
    a first turntable configured for rotatably supporting a first copy of the phonograph record, the first turntable including at least the first tonearm associated with the one or more first calibrations related to distortion reduction within the first recording area; and
    at least a second turntable configured for rotatably supporting at least a second copy of the phonograph record, the at least a second turntable including at least the at least a second tonearm associated with one or more second calibrations related to distortion reduction within the at least a second recording area.

16. The system of claim 8, wherein circuitry configured for stitching the first audio segment and the at least a second audio segment comprises:
    circuitry configured for determining at least one splice point between the first audio segment and the at least a second audio segment at least partially via application of autocorrelation to the first audio segment and the at least a second audio segment to align at least one overlapping portion of the first audio segment with the at least a second audio segment.

17. The system of claim 8, wherein circuitry configured for stitching the first audio segment and the at least a second audio segment comprises:
    circuitry configured for determining at least one splice point between the first audio segment and the at least a second audio segment at least partially via averaging one or more stochastic differences between the first audio segment and the at least a second audio segment.

18. The system of claim 8, wherein circuitry configured for stitching the first audio segment and the at least a second audio segment comprises:
    circuitry configured for determining at least one splice point between the first audio segment and the at least a second audio segment at least partially via matching a waveform representation of the first audio segment and at least one waveform representation of the at least a second audio segment, the at least one splice point occurring where amplitudes of the waveform representations cross over at zero.

19. The system of claim 8, wherein circuitry configured for stitching the first audio segment and the at least a second audio segment comprises:
    circuitry configured for determining at least one splice point between the first audio segment and the at least a second audio segment, the at least one splice point occurring where distortion is equal within the first audio segment and the at least a second audio segment.

20. The system of claim 1, wherein circuitry configured for stitching the first audio segment and the at least a second audio segment, including at least outputting a continuous audio stream associated with reduced distortion relative to an audio stream captured by a single tonearm of the first and second recording areas of the phonograph record comprises:
    circuitry configured for determining at least one splice point between the first audio segment and the at least a second audio segment, including at least aligning the first audio segment and the at least a second audio segment at least partially via autocorrelation.

\* \* \* \* \*